United States Patent
Hashimoto et al.

(10) Patent No.: US 10,606,235 B2
(45) Date of Patent: Mar. 31, 2020

(54) MOTOR CONTROL DEVICE, MOTOR POSITION CONTROL METHOD, AND INDUSTRIAL MACHINE

(71) Applicant: Panasonic Intellectual Property Management Co., Ltd., Osaka (JP)

(72) Inventors: Atsumi Hashimoto, Osaka (JP); Hiroyuki Nakata, Osaka (JP); Yasuyoshi Honuchi, Osaka (JP); Ryosuke Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/310,494

(22) PCT Filed: Apr. 7, 2017

(86) PCT No.: PCT/JP2017/014493
§ 371 (c)(1),
(2) Date: Dec. 17, 2018

(87) PCT Pub. No.: WO2018/047394
PCT Pub. Date: Mar. 15, 2018

(65) Prior Publication Data
US 2019/0339666 A1    Nov. 7, 2019

(30) Foreign Application Priority Data
Sep. 8, 2016   (JP) .................................. 2016-175739

(51) Int. Cl.
*G05B 19/19*   (2006.01)
*B25J 9/16*    (2006.01)
(Continued)

(52) U.S. Cl.
CPC ................ *G05B 19/19* (2013.01); *B25J 9/16* (2013.01); *G05D 3/12* (2013.01); *H02P 29/00* (2013.01); *G05B 2219/43* (2013.01)

(58) Field of Classification Search
CPC ...... H02P 1/00; H02P 1/04; H02P 1/46; H02P 3/00; H02P 3/18; H02P 27/04;
(Continued)

(56) References Cited

U.S. PATENT DOCUMENTS

| | | | | |
|---|---|---|---|---|
| 4,980,625 A | * | 12/1990 | Shimada | ................ G05B 19/19 |
| | | | | 318/568.1 |
| 6,084,374 A | * | 7/2000 | Nakatsuka | ............. B25J 9/1638 |
| | | | | 318/568.1 |

(Continued)

FOREIGN PATENT DOCUMENTS

| JP | 11-102215 | 4/1999 |
|---|---|---|
| JP | 2007-072943 | 3/2007 |

(Continued)

OTHER PUBLICATIONS

International Search Report of PCT application No. PCT/JP2017/014493 dated Jul. 4, 2017.

(Continued)

*Primary Examiner* — Antony M Paul
(74) *Attorney, Agent, or Firm* — Wenderoth, Lind & Ponack, L.L.P.

(57) ABSTRACT

A motor control device includes a movement command generation unit, a movement command processing unit, and a control unit. The movement command generation unit outputs a movement command of a motor. The movement command processing unit includes a buffer, a filter, and a processing unit. The buffer holds the movement command. The filter performs filter processing of a constant and generates a new constant. The processing unit performs (Continued)

arithmetic processing based on the movement command held in the buffer and the new constant generated by the filter, and generates and outputs a new movement command proportional to the new constant. The control unit controls the motor based on the new movement command.

13 Claims, 15 Drawing Sheets

(51) Int. Cl.
     *G05D 3/12*         (2006.01)
     *H02P 29/00*       (2016.01)

(58) Field of Classification Search
     CPC .......... H02P 27/06; H02P 23/00; H02P 27/00; H02P 6/00; H02P 6/14; H02P 7/00; H02P 8/00; H02M 1/126; H02M 1/15; G05B 11/01; G05B 13/00; G05B 19/04; B25J 9/18; B25J 5/00
     USPC ........ 327/531, 532, 552, 554; 370/290, 291; 363/47; 708/314; 701/479, 535; 318/560, 561, 568.11, 568.12, 568.2, 628, 318/632

See application file for complete search history.

(56) References Cited

U.S. PATENT DOCUMENTS 7,292,000 B2 * 11/2007 Saotome ................ B25J 13/088
                                                             318/561
2016/0313721 A1   10/2016  Tazawa et al.

FOREIGN PATENT DOCUMENTS

| | | |
|---|---|---|
| JP | 2008-015610 | 1/2008 |
| JP | 2011-170609 | 9/2011 |
| WO | 2015/129207 | 9/2015 |

OTHER PUBLICATIONS

Extended European Search Report dated Sep. 26, 2019 in corresponding European Patent Application No. 17848341.8.

* cited by examiner

Movement direction of welding torch

MOTOR CONTROL DEVICE, MOTOR POSITION CONTROL METHOD, AND INDUSTRIAL MACHINE

CROSS REFERENCE TO RELATED APPLICATIONS

This application is U.S. national stage application of the PCT International Application No. PCT/JP2017/014493 filed on Apr. 7, 2017, which claims the benefit of foreign priority of Japanese patent application 2016-175739 filed on Sep. 8, 2016, the contents all of which are incorporated herein by reference.

TECHNICAL FIELD

The present disclosure relates to a motor control device that performs filter processing of a movement command and performs position control, a motor position control method, and an industrial machine using the control device.

BACKGROUND ART

Conventionally, in performing position control of a motor for operating an automatic transfer system, a robot, and the like, as shown in PTL 1, a technology of inserting a filter between a movement command generation unit and a control unit to achieve smooth acceleration/deceleration by performing filter processing of a movement command of a motor has been known.

CITATION LIST

Patent Literature

PTL 1: Japanese Patent Unexamined Publication No. H11-102215

SUMMARY OF THE INVENTION

A motor control device of the present disclosure includes a movement command generation unit, a movement command processing unit, and a control unit.

The movement command generation unit outputs a movement command of a motor.

The movement command processing unit includes a buffer, a filter, and a processing unit.

The buffer holds the movement command.

The filter performs filter processing of a constant and generates a new constant.

The processing unit performs arithmetic processing based on the movement command held in the buffer and the new constant generated by the filter, and generates and outputs a new movement command proportional to the new constant.

The control unit controls the motor based on the new movement command.

A motor position control method of the present disclosure is a method for performing position control of a motor, using a movement command processing unit including a buffer, a filter, and a processing unit.

The motor position control method of the present disclosure includes: a first step of inputting and holding a movement command in the buffer; a second step of inputting a constant into the filter, performing filter processing of the constant, and generating a new constant; a third step of extracting the movement command held in the buffer, adding the extracted movement command to a value held in a first holding section in the processing unit, and holding the addition value as a first addition value, while adding the constant to a value held in a second holding section in the processing unit, and holding the addition value as a second addition value; and a fourth step of performing an arithmetic operation based on the new constant, the first addition value, and the second addition value, and generating a new movement command proportional to the new constant, while subtracting the new movement command from the first addition value held in the first holding section to obtain a value and holding the obtained value in the first holding section, and subtracting the new constant from the second addition value held in the second holding section to obtain a value and holding the obtained value in the second holding section.

An industrial machine of the present disclosure includes a motor, a motor control device that controls the motor, and an object to be driven by the motor. Herein, a cut-off frequency of the filter is a natural vibration frequency of the object to be driven.

DESCRIPTION OF EMBODIMENTS

As disclosed in PTL 1, by performing filter processing of a movement command from a movement command generation unit, it is possible to remove an excitation component included in the movement command, that is, a component inducing a vibration of a machine driven by a motor.

However, when a position of a motor is controlled by the filter-processed movement command, a movement trajectory of a robot driven by a motor, and the like, may not coincide with an originally indicated movement trajectory.

This is because a movement command after filter processing is constituted in a state in which a component of different time series is mixed in the movement command before filter processing.

First Exemplary Embodiment

This exemplary embodiment is described in detail based on the drawings. The following descriptions of the preferable exemplary embodiments are merely examples in nature, and are not intended to limit the present invention, applications, and use of the invention.

Figure 1:
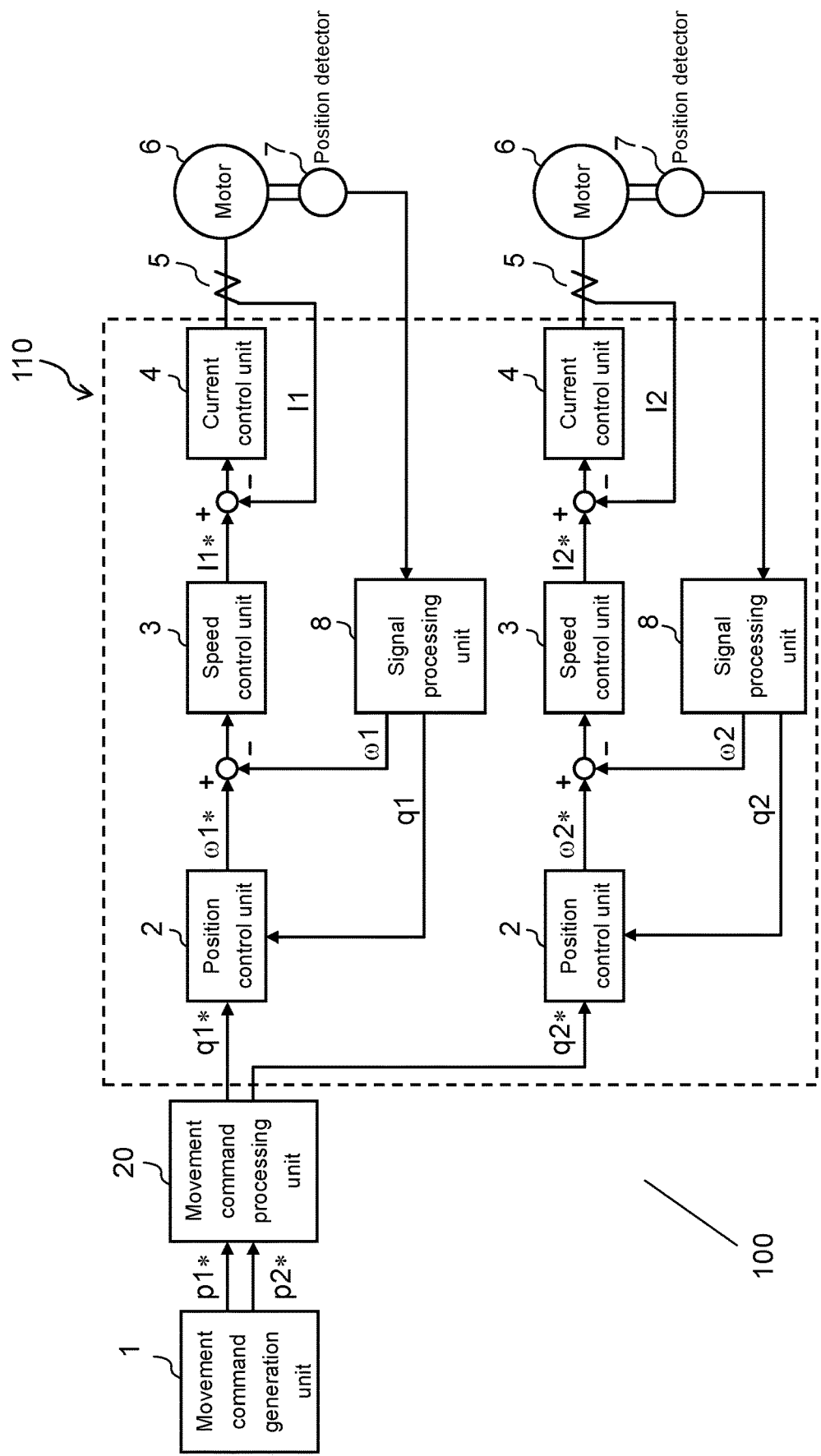
FIG. 1 is a block diagram showing a configuration of a motor control device in accordance with a first exemplary embodiment.

FIG. 1 is a block diagram showing a configuration of a motor control device in accordance with this exemplary embodiment.

Note here that this exemplary embodiment shows an example in which position control of a motor is carried out biaxially.

Configuration of Motor Control Device

As shown in FIG. 1, motor control device 100 includes movement command generation unit 1, movement command processing unit 20, and control unit 110. Motor control device 100 may further include motor 6, current detector 5, and position detector 7. Movement command generation unit 1 generates a movement command for driving motor 6. Movement command processing unit 20 processes the movement command from movement command generation unit 1 and outputs a new movement command. Current detector 5 detects a driving current of motor 6. Position detector 7 detects a rotation angle of motor 6. Control unit 110 includes position control unit 2, speed control unit 3, current control unit 4, and signal processing section 8. Position control unit 2 controls a position of motor 6. Speed control unit 3 controls rotation speed of motor 6. Current control unit 4 controls a driving current of motor 6. Signal processing section 8 processes a signal from position detector 7. The signal processed in signal processing section 8 is converted into an actual rotation angular velocity ω and an actual movement amount q of an object (a robot and the like) to be driven by motor 6.

As shown in FIG. 1, the motor control device includes two sets, that is, for two axes, of motors 6, position detectors 7, and current detectors 5. Furthermore, the motor control device includes two sets, that is, for two axes, of position control units 2, speed control units 3, current control units 4, and signal processing sections 8. In FIG. 1, suffix 1 is attached to a signal of each part of the first axis, and suffix 2 is attached to a signal of each part of the second axis.

In the following description, suffix 1 and suffix 2 are represented by suffix m (m=1 or 2).

Movement command generation unit 1 generates movement command pm* by performing a trajectory plan based on an operation program formed by a user. Movement command pm* is output for each predetermined period as a rotation amount per unit time of the motor.

Movement command processing unit 20 receives movement commands pm* output from movement command generation unit 1 for each predetermined period, processes the received commands for each predetermined period, and generates and outputs new movement commands qm*.

Position control unit 2 receives movement commands qm* output from movement command processing unit 20 for each predetermined period, integrates the received movement commands, and subtracts actual movement amount qm for each predetermined period. Herein, an actual movement amount qm is a rotation-angle movement amount of the motor for each predetermined time and is obtained by processing output of position detector 7 by signal processing section 8. That is to say, "*" is attached to values regarding the commands obtained via movement command generation unit 1 and movement command processing unit 20. To values actually obtained values obtained by driving the motor, "*" is not attached.

Position control unit 2 holds a position deviation amount which is a difference between the time series sum of movement commands qm* and time series sum of actual movement amount qm. Position control unit 2 outputs a speed command ωm* which is the product obtained by multiplying the position deviation amount by a proportional constant (position gain).

Furthermore, a value obtained by multiplying movement command qm* by a proportional constant (feedforward gain) may be added to the speed command ωm*.

Speed control unit 3 receives a difference value between speed command ωm* from position control unit 2 and actual speed ωm of the motor, performs, for example, a Proportional-Integral (PI) control thereon, and outputs current command Im*. Herein, the actual speed ωm is obtained by processing an output of position detector 7 in signal processing section 8.

Current control unit 4 receives a difference between current command Im* from speed control unit 3 and actual electric current Im, and performs, for example, a PI control thereon so as to control a driving current of motor 6.

Note here that actual electric current Im is detected by current detector 5.

The motor control device having a configuration shown in FIG. 1 is applied to an industrial machine such as a robot.

Note here that FIG. 1 shows a two-axis configuration, but an articulated robot includes motors and control units the number of which corresponds to the number of joints. Each motor is connected to a robot arm via a speed reducer.

Configuration of Movement Command Processing Unit

Figure 2:
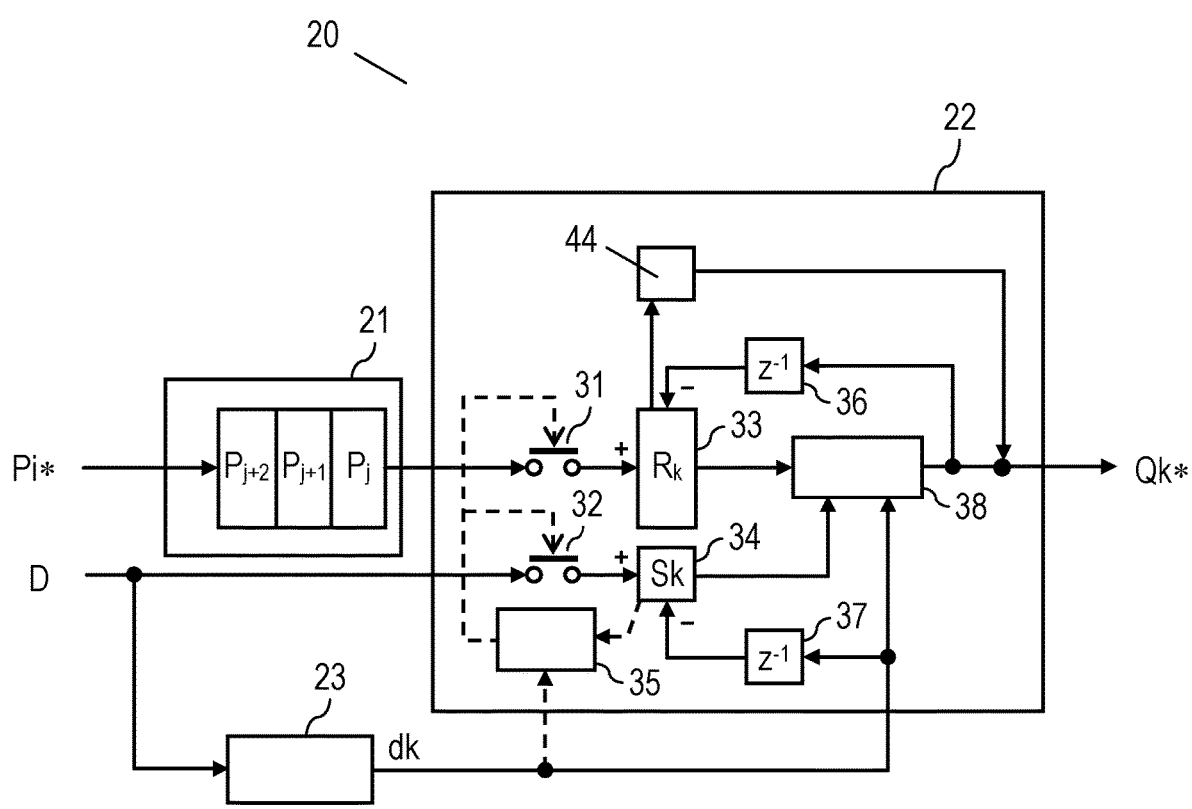
FIG. 2 is a block diagram showing a configuration of a movement command processing unit in accordance with the first exemplary embodiment.

FIG. 2 is a block diagram showing a configuration of movement command processing unit 20 in accordance with this exemplary embodiment.

As shown in FIG. 2, movement command processing unit 20 includes buffer 21, processing unit 22, and filter 23.

Buffer 21 receives and temporarily holds movement commands pm* (m=1, 2) from movement command generation unit 1.

Buffer 21 performs a so-called FIFO (First-In First-Out) operation in which data input first are output first.

Movement command Pi* to be input into buffer 21 is a vector quantity having movement command pm* (m=1, 2) shown in FIG. 1 as an element. Suffix i attached to movement command Pi* represents order of input into buffer 21.

Figure 4:
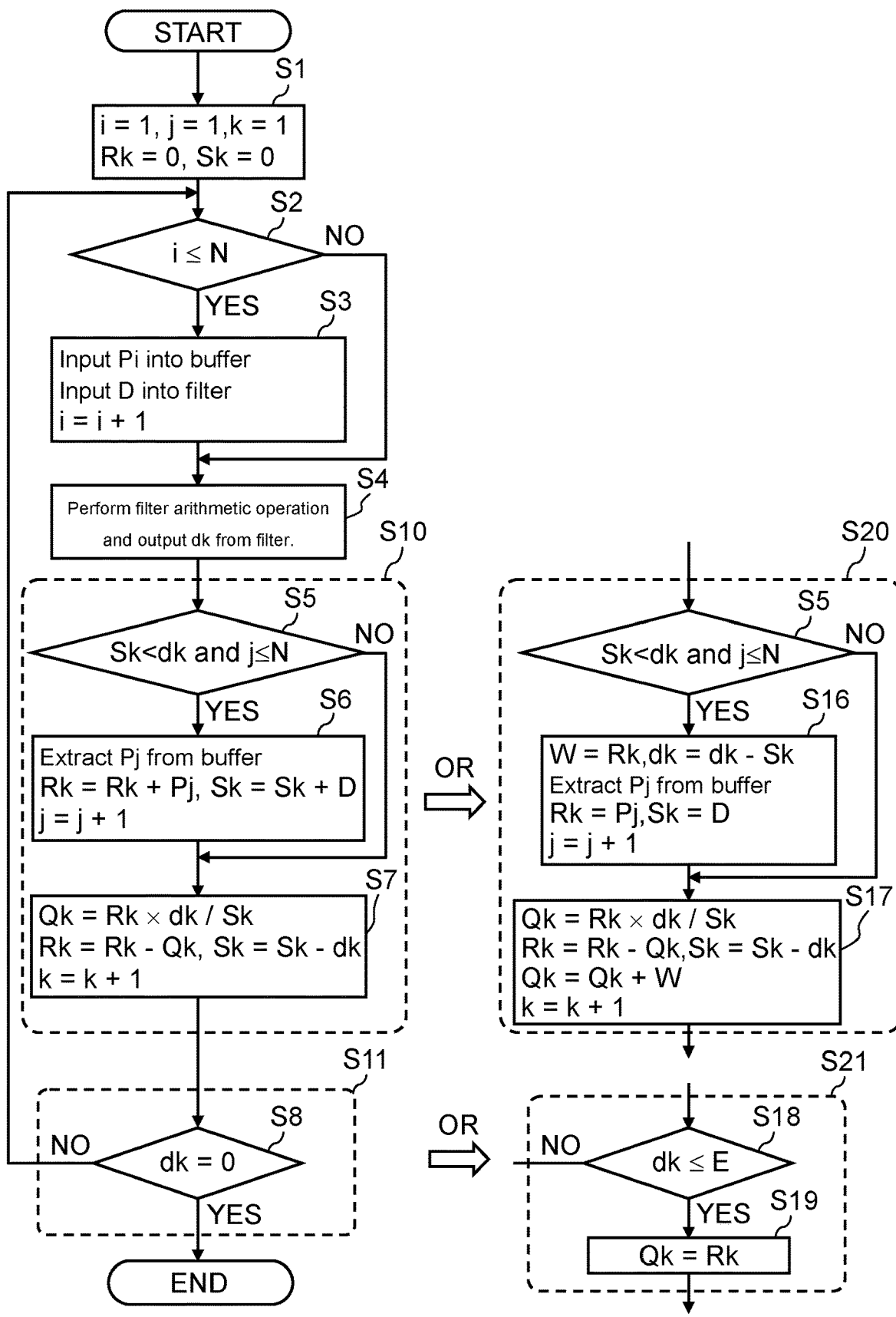
FIG. 4 shows a flowchart in the movement command processing unit in accordance with the first exemplary embodiment.
Figure 12:
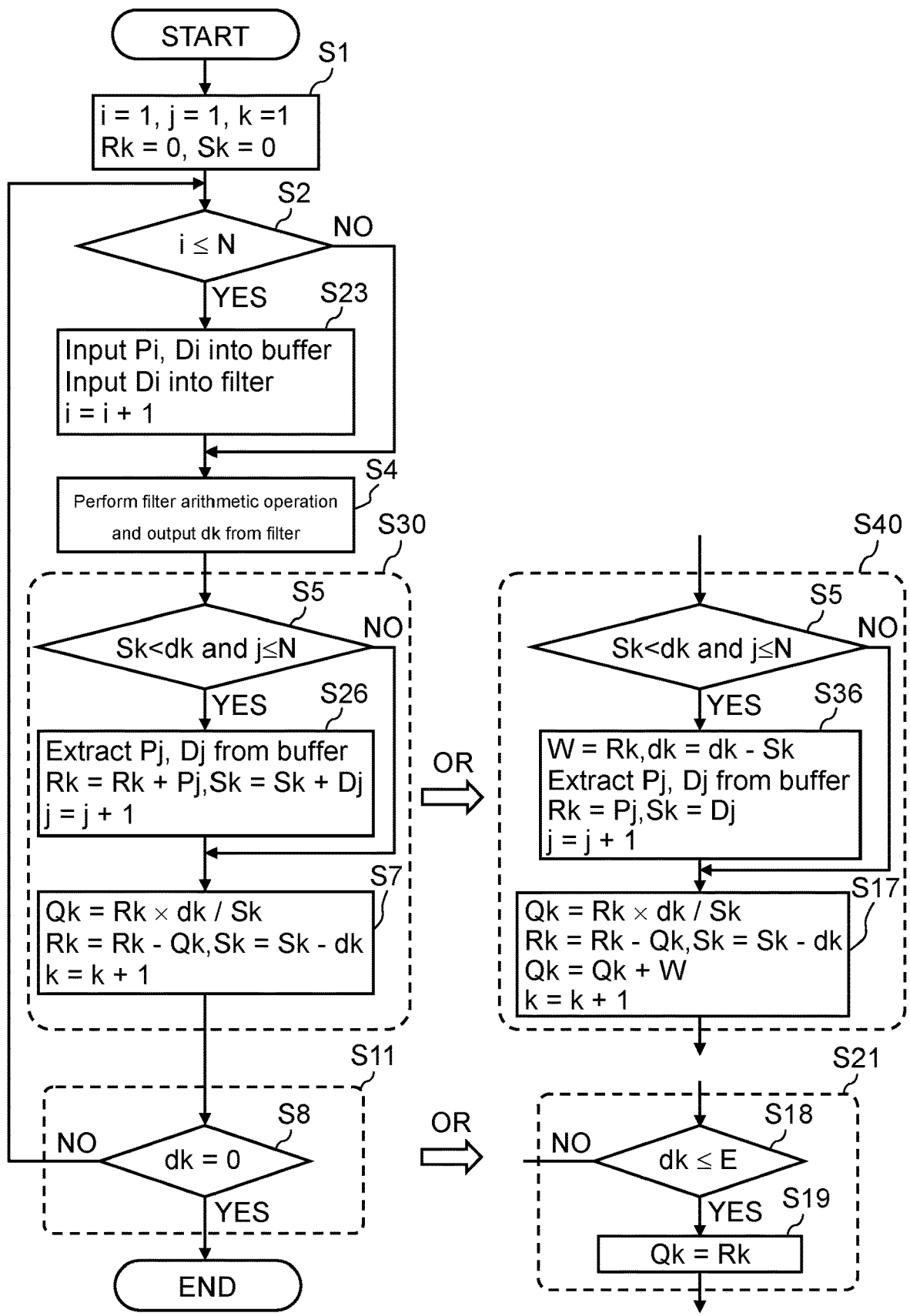
FIG. 12 shows a flowchart in the movement command processing unit in accordance with the second exemplary embodiment.

Note here that in the flowcharts of FIGS. 4 and 12, "*" is not attached.

Movement command Pi* is input into buffer 21 for each predetermined period. Furthermore, suffix j of movement command Pj held in buffer 21 represents an order of extraction of movement command Pj from buffer 21.

Extraction of movement command Pj held in buffer 21 is carried out at any time, and it is not necessarily synchronized with input of movement command Pi* into buffer 21.

Processing unit 22 extracts movement command Pj from buffer 21, processes the extracted command, and outputs the processed command as a new movement command Qk*.

Herein, movement command Qk* represents a vector quantity having the movement command of each axis as an element.

Furthermore, suffix k of movement command Qk* represents an order of Qk* output from processing unit 22.

Figure 3A:
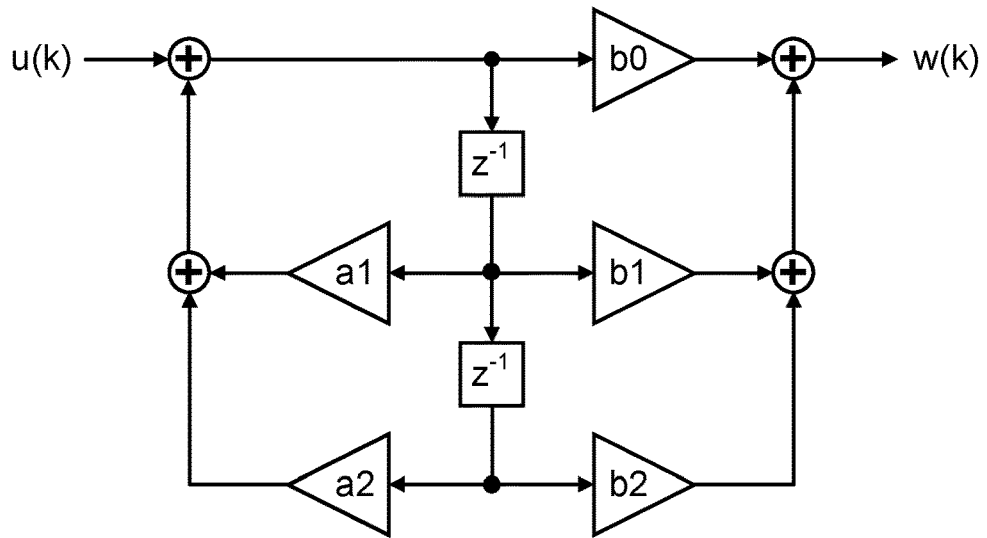
FIG. 3A is a block diagram showing a configuration of an IIR (Infinite Impulse Responsibility) digital filter in accordance with the first exemplary embodiment.
Figure 3B:
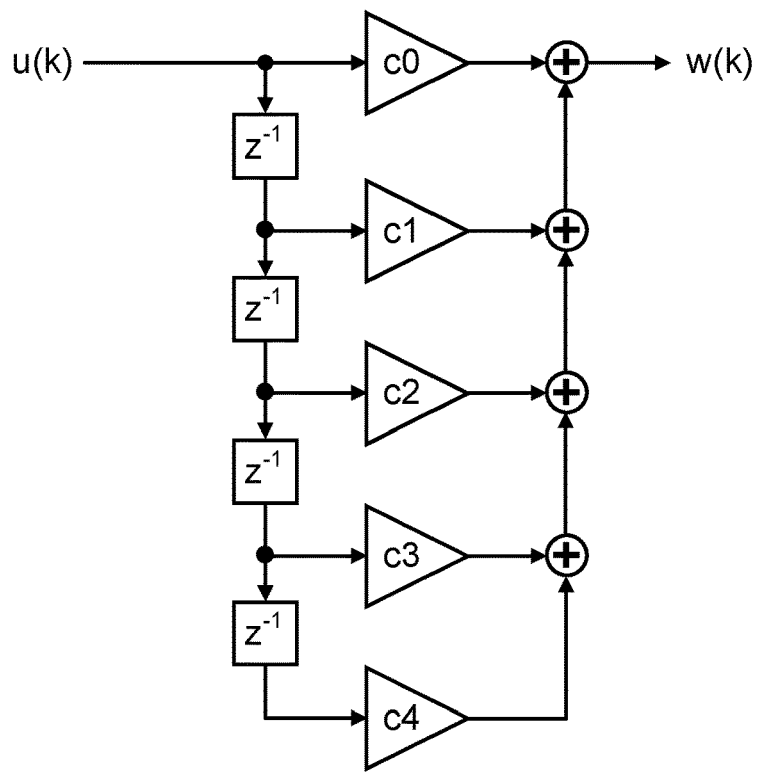
FIG. 3B is a block diagram showing a configuration of a FIR (Finite Impulse Responsibility) digital filter in accordance with the first exemplary embodiment.

FIGS. 3A and 3B show examples of configurations of filter 23 in accordance with this exemplary embodiment. FIG. 3A is a block diagram showing a configuration of an IIR digital filter. FIG. 3B is a block diagram showing a configuration of an FIR digital filter. Filter 23 is a digital filter, and, for example, the IIR (Infinite Impulse Responsibility) digital filter shown in FIG. 3A is used. The FIR (Finite Impulse Responsibility) digital filter shown in FIG. 3B may be used. Alternatively, the other configurations may be employed.

a1, a2, b0, b1, and b2 shown in FIG. 3A, and c0 to c4 shown in FIG. 3B are constants. These values are used to determine a cut-off frequency of filter 23. Furthermore, "z−1" shown in FIGS. 3A and 3B is one-period delay component (one-sample delay component). Note here that in the drawings, "z−1" is shown by "$z^{-1}$" written in the superscript numeral.

Filter 23 performs an arithmetic operation in synchronization with input, and outputs the results.

Furthermore, filter 23 performs an arithmetic operation and outputs the results for each predetermined period, also after input of a series of data row is completed. Then, an arithmetic operation is repeatedly performed for each predetermined period at least until the output becomes 0 value.

Furthermore, in filter 23, the time series sum of input and the time series sum of output equal to each other. The constants a1, a2, b0, b1, and b2, or c0 to c4 shown in FIGS. 3A and 3B are determined so as to satisfy this condition.

Note here that FIG. 3A shows a second-order IIR digital filter, but the digital filter may be a first-order or a third- or higher-order IIR digital filter.

Furthermore, FIG. 3B shows a fifth-order FIR digital filter, but the digital filter may be a fourth- or lower-order, or sixth- or higher-order FIR filter.

The constant values of filter 23 may be any combination of values as long as the sum thereof is 1, and it is set so that the output converges to 0 when the input is stopped. Usually, the value is set so that the vibration component is removed in response to the natural vibration of an industrial machine such as a robot driven by motor 6.

Movement constant D is input into filter 23 in synchronization with input of movement command Pi* into buffer 21 (FIG. 2).

Movement constant D is a scalar quantity, and is a fixed value of any size.

Filter 23 performs a filter arithmetic operation in synchronization with input of movement constant D, and the results are output as a new movement constant dk.

Herein, suffix k of dk represents the order of value dk output from the filter. The output of dk from filter 23 and the output of Qk* from processing unit 22 are synchronized.

Configuration and Operation of Processing Unit

As shown in FIG. 2, movement command Pj from buffer 21 is input into holding section 33 (first holding section). That is to say, movement command Pj is added to an element of holding section 33 in the movement command, and held as Rk. Rk is a movement command, and is a vector quantity having a movement command of each axis as an element.

Movement constant D is input into holding section 34 (second holding section). That is to say, movement constant D is added to an element of holding section 34 in the movement command, and held as Sk. Value Sk held by holding section 34 is a scalar quantity.

A path between the input and output is opened/closed by switches 31 and 32 based on the instruction from determination unit 35.

Determination unit 35 compares value dk output by filter 23 with value Sk held by holding section 34. When Sk is smaller than dk, determination unit 35 closes switches 31 and 32.

When switch 31 is closed, movement command Pj is extracted from buffer 21, and the movement command Pj is added to value Rk held by holding section 33.

Furthermore, when switch 32 is closed, movement constant D is added to value Sk held by holding section 34. When each addition is executed, switches 31 and 32 are returned to an opened state.

Note here that value dk output by filter 23 is not more than value Sk held by holding section 34, switches 31 and 32 remain open, and addition of movement command Pj to holding section 33 and addition of movement constant D to holding section 34 are not carried out.

Arithmetic operation unit 38 performs calculation of the mathematical formula Math. 1 using value Rk held by holding section 33, value Sk held by holding section 34, and value dk output by filter 23 to generate and output a new movement command Qk*.

$$Qk^* = Rk \times dk / Sk \qquad \text{[Math. 1]}$$

Note here that the mathematical formula Math. 1 is a vector arithmetic operation, in which Qk* and Rk represent a vector quantity, and dk/Sk represents a scalar quantity.

After the movement command Qk* is generated, movement command Rk held in holding section 33 and value Sk held in holding section 34 are updated as shown in the mathematical formulae 2 and 3.

$$Rk = Rk - Qk* \qquad \text{[Math. 2]}$$

$$Sk = Sk - dk \qquad \text{[Math. 3]}$$

Herein, elements 36 and 37 are one-period delay elements (one-sample delay elements).

Value Rk updated in the mathematical formula Math. 2 and Sk updated in the mathematical formula Math. 3 are values to be used in the arithmetic operation period of the next time. On the other hand, value Qk* to be used in the mathematical formula Math. 2 and value dk to be used in the mathematical formula Math. 3 are values obtained in the arithmetic operation period at this time.

That is to say, in the arithmetic operation period of the next time, values calculated in one period before are used. Elements 36 and 37 correspond to the values calculated in one period before.

Flow of Movement Command

FIG. 4 is a flowchart of movement command processing unit 20 in accordance with this exemplary embodiment.

Note here that symbols such as Rk, dk, and Pj in FIG. 4 are the same as described above.

Furthermore, reference mark N represents the number of movement commands Pi to be input to movement command processing unit 20.

Firstly, in movement command processing unit 20, initialization of values is carried out (step S1). The initial value 1 of suffixes i, j, and k shows the first data. Value Rk is a vector quantity, value Sk is a scalar quantity, and the values are initialized to 0.

Next, whether movement command Pi is present is determined (step S2). Specifically, when value i showing the order of input of movement command Pi is not more than the number N of movement commands Pi, it is determined that movement command Pi is present, the process proceeds to the next step, and movement command Pi is input into buffer 21 (step S3).

In addition, movement command D is also input into filter 23. Furthermore, suffix i is moved up for an arithmetic operation of the next period. Then, the process proceeds to the next step S4.

Furthermore, when i is larger than N, it means that all movement commands Pi have been input into buffer 21. Therefore, step S3 is not performed, and the process proceeds to step S4.

Next, a filter arithmetic operation is performed in filter 23, and the result thereof is output as a new movement constant dk (step S4).

Note here that when input into filter 23 is not made, an arithmetic operation is performed supposed that the value 0 is input, and dk is output.

Next, size comparison between Sk and filter output dk, and size comparison between value j that represents the number of extractions of movement command Pj from buffer 21 and the number N of movement command Pi are carried out (step S5).

When Sk is smaller than dk, and j is not more than N, the process proceeds to the next step, and movement command Pj is extracted from buffer 21 and added to Rk (step S6). In addition, movement constant D is added to Sk. Furthermore, suffix j is moved up for an arithmetic operation of the next period. Then, the process proceeds to step S7.

When Sk is not less than dk, step S6 is not performed and the process proceeds to step S7.

Also when j is larger than N, it means that all movement commands Pj have been extracted from buffer 21. Therefore, step S6 is not performed and the process proceeds to step S7.

In step S7, arithmetic operations represented by the mathematical formulae 1, 2, and 3 are performed. Furthermore, suffix k is moved up for an arithmetic operation of the next period. Then, the process proceeds to step S8.

Next, whether the filter output dk is present is determined (step S8).

When the value of dk is 0, the processing is ended. When the value of dk is not 0, the process proceeds to step S2 to start the arithmetic operation of the next period, the processing from step S2 to step S8 is repeated for each arithmetic operation period.

Herein, it should be noted that also after movement command Pi is input into buffer 21 N times, movement command Pj is present in buffer 21, and also after all movement commands Pj are extracted from buffer 21, values remain in the filter 23, and dk is output.

For this reason, value dk is checked and the end of the loop is repeatedly determined in step S8.

Note here that the arithmetic operation represented by the mathematical formula Math. 1 in step S7 may use an arithmetic operation represented by mathematical formula Math. 4.

$$Qk* = Rk - Rk \times (Sk - dk)/Sk \qquad \text{[Math. 4]}$$

In the case where each quantity to be used in the arithmetic operation represented by the mathematical formula Math. 1 is an integer, when value dk is small, the value of Qk* may become 0 truncated after the decimal point. In this case, the repeated arithmetic operation is completed in a state in which the value remains in Rk. In other words, some displacement may occur between the target position of movement and the actual arrival position. Use of the arithmetic operation represented by the mathematical formula Math. 4 can prevent the displacement.

Incidentally, step S10 (a series of processing from step S5 to step S7) shown in FIG. 4 is executed by processing unit 22 shown in FIG. 2.

This step S10 may be replaced to step S20 shown in FIG. 4.

In step S20, step S16 in place of step S6 and step S17 in place of step S7 are executed, respectively.

W in Steps S16 and S17 is a value temporarily stored in holding section 44 (third holding section) of processing unit 22.

When Sk is smaller than dk, in step S16, original Rk is temporarily stored in holding section 44 as W. Then, Sk is subtracted from dk. Moreover, Pj is extracted from buffer 21 and substituted into Rk, and D is substituted into Sk.

In step S17, calculation of Qk* and update of Rk and Sk are carried out by the same processing as in step S7. In step S16, to the thus obtained Qk*, W that is a value temporarily stored in holding section 44 is added to obtain Qk* output by processing unit 22 of FIG. 2.

Furthermore, the processing of step S11 may be replaced to the processing of step S21. Value E of step S18 in step S21 is an optional value.

According to Step 21, the repeated arithmetic operation is completed at the time when filter output dk is converged into a sufficiently small predetermined value E. Therefore, time required to reach the target position can be reduced.

Figure 5A:
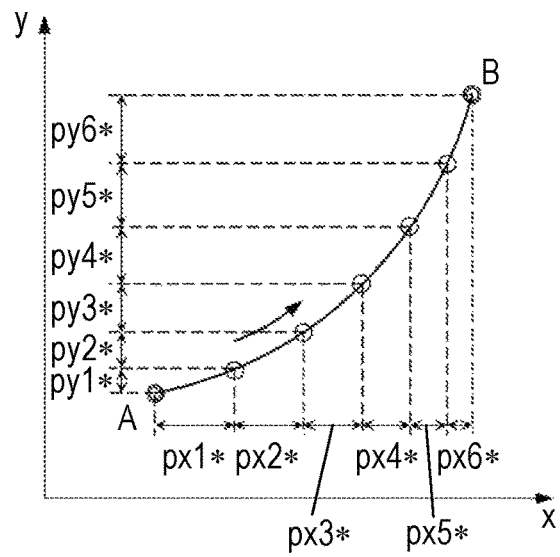
FIG. 5A shows the xy trajectory by a movement command of the motor control device in accordance with the first exemplary embodiment.
Figure 5B:
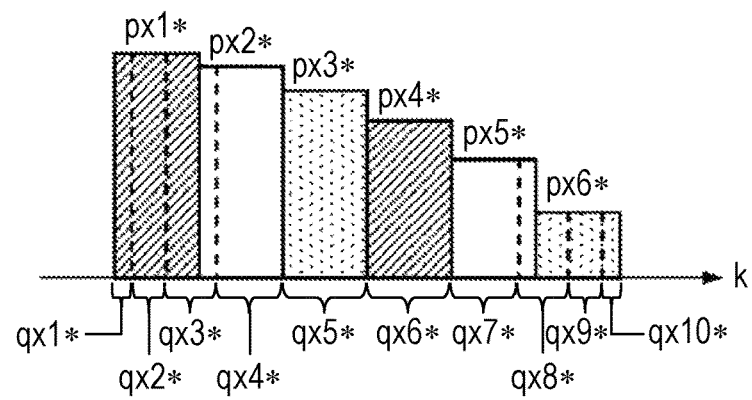
FIG. 5B shows a time series of the movement command with respect to the x-axis.
Figure 5C:
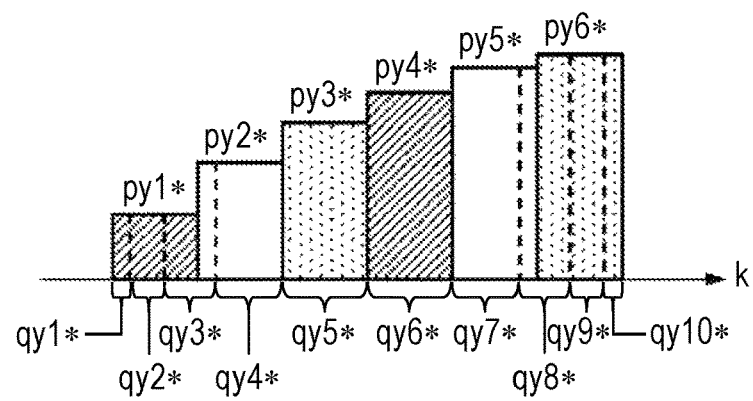
FIG. 5C shows a time series of the movement command with respect to the y-axis.
Figure 5D:
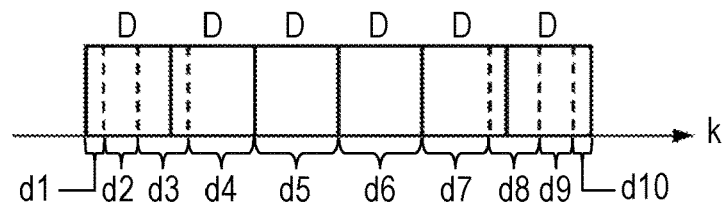
FIG. 5D shows a time series of movement constant output.

Relation between Movement Command and Movement Trajectory Before and After Movement Command Processing FIGS. 5A to 5C show time series of the movement command of motor control device 100 in accordance with this exemplary embodiment, and trajectory by the movement command. FIG. 5A shows the xy trajectory by the movement command. FIG. 5B shows time series of the movement command with respect to the x-axis. FIG. 5C shows time series of the movement command with respect to the y-axis. FIG. 5D shows time series of the movement command. FIGS. 5A to 5D show a state before processing in movement command processing unit 20.

Figure 6A:
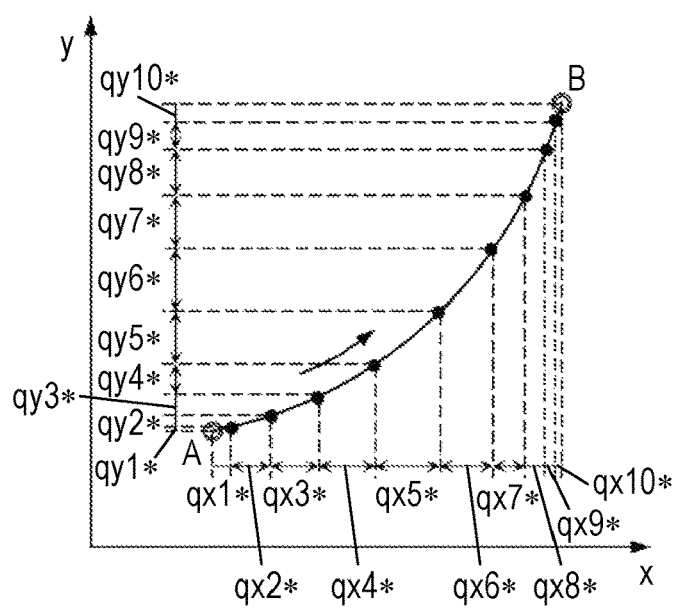
FIG. 6A shows the xy trajectory by a movement command after execution of the flowchart shown in FIG. 4.
Figure 6B:
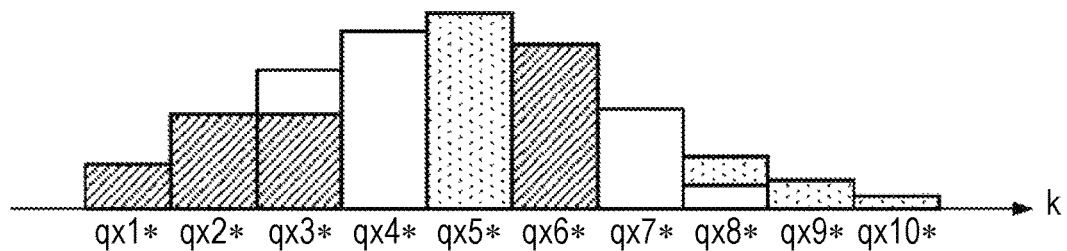
FIG. 6B shows a time series of the movement command after processing with respect to the x-axis.
Figure 6C:
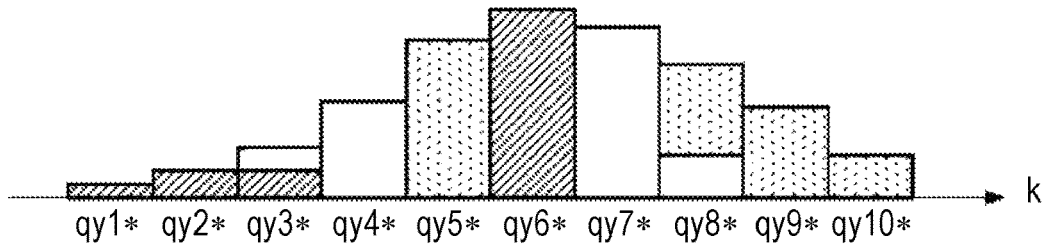
FIG. 6C shows a time series of the movement command after processing with respect to the y-axis.
Figure 6D:
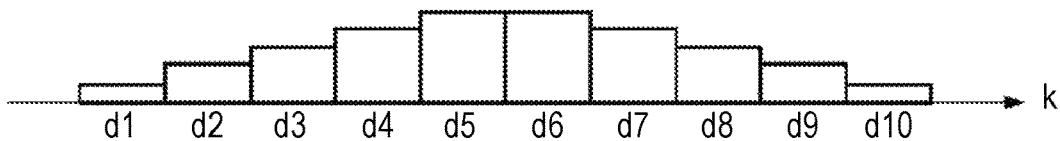
FIG. 6D shows a time series of movement constant output after processing.

FIGS. 6A to 6C show a time series of the movement command after processing of the flowchart shown in FIG. 4 and the trajectory by the movement command. FIG. 6A shows the xy trajectory by the movement command after processing. FIG. 6B shows a time series of the movement command with respect to the x-axis after processing. FIG. 6C shows a time series of the movement command with respect to the y-axis after processing. FIG. 6D shows a time series of movement constant output after processing. FIGS. 6A to 6D show a state after processing in movement command processing unit 20.

Note here that filter 23 is a five-stage FIR digital filter, and a filter constant of each stage is ⅕. That is to say, filter 23 is a five times average filter.

Herein, for comparison with the motor control device in accordance with this exemplary embodiment, a configuration provided with filter 10 instead of movement command processing unit 20 in a configuration shown in FIG. 1 is made to be Comparative Example. The block diagram thereof is shown in FIG. 9, and the relationship between the time series of the movement command and the trajectory by the movement command are shown in FIGS. 7 and 8.

Figure 7A:
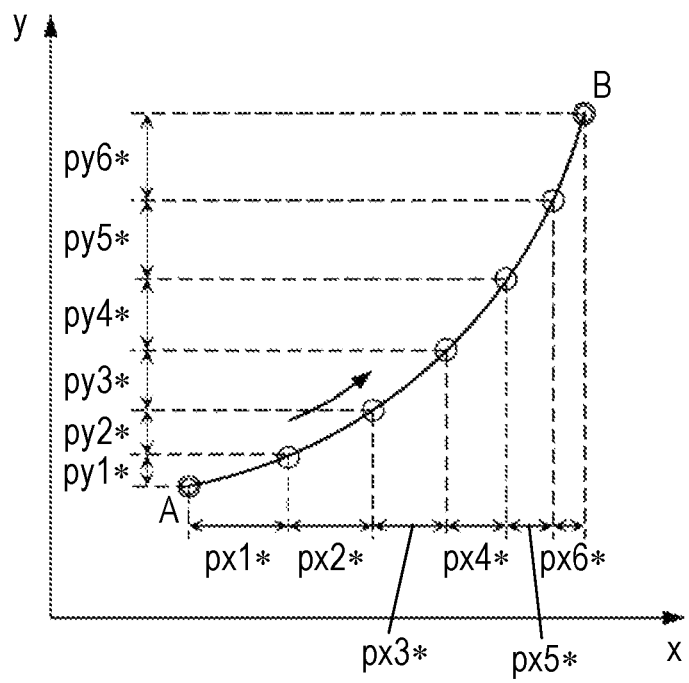
FIG. 7A shows the xy trajectory of a motor control device by a movement command in accordance with Comparative Example.
Figure 7B:
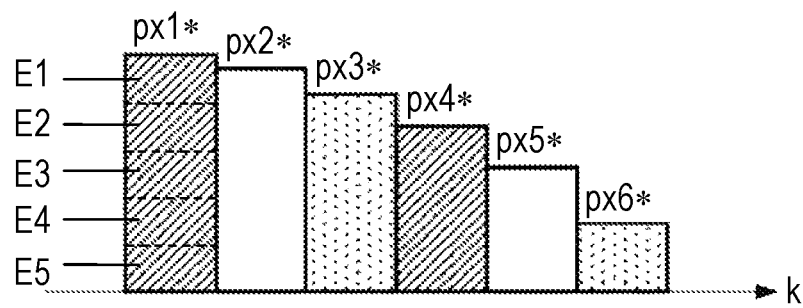
FIG. 7B shows a time series of the movement command with respect to the x-axis.
Figure 7C:
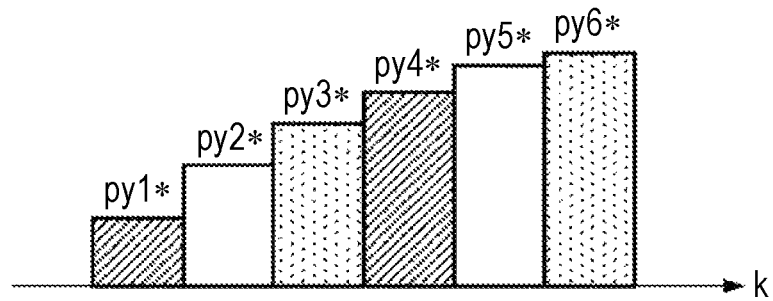
FIG. 7C shows a time series of the movement command with respect to the y-axis.

FIGS. 7A to 7C show a time series of the movement command and the trajectory of the movement command of the motor control device in accordance with Comparative Example. FIG. 7A shows the xy trajectory by the movement command. FIG. 7B shows a time series of the movement command with respect to the x-axis. FIG. 7C shows a time series of the movement command with respect to the y-axis. FIGS. 7A to 7D show a state before processing in filter 10.

Figure 8A:
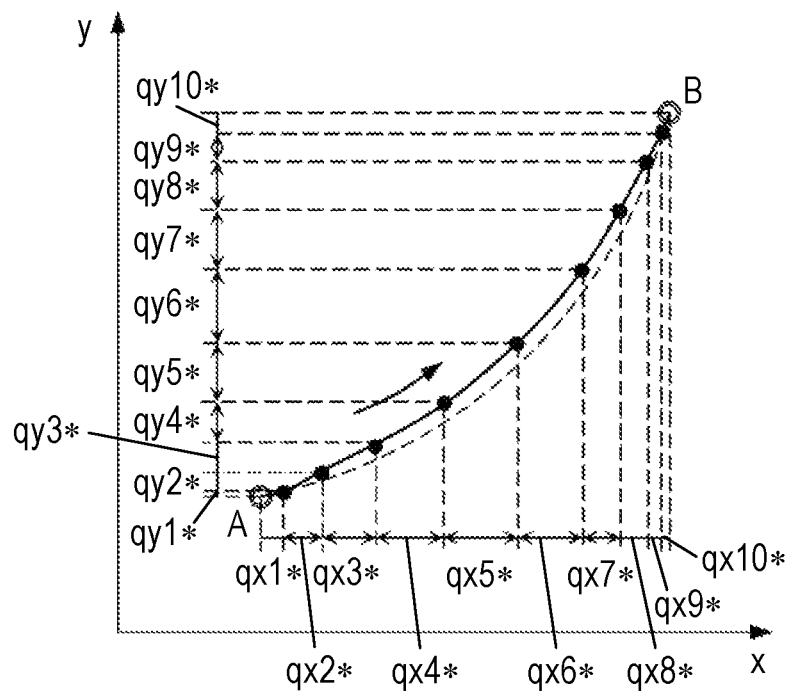
FIG. 8A shows the xy trajectory of a movement command after filter processing of the motor control device in accordance with Comparative Example.
Figure 8B:
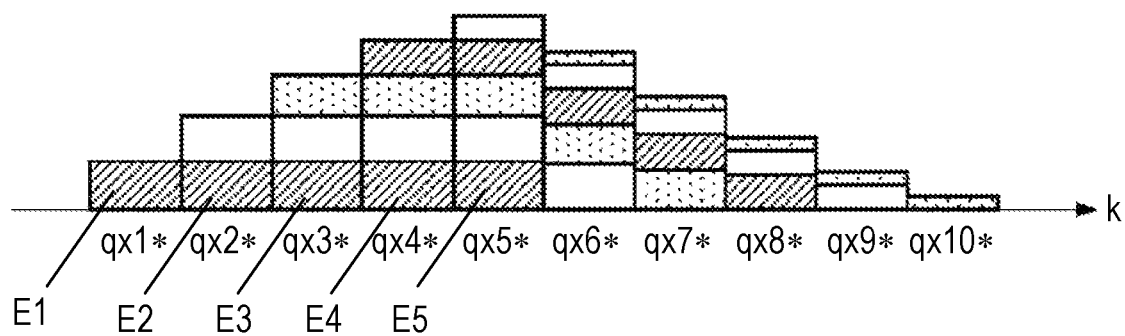
FIG. 8B shows a time series of the movement after filter processing with respect to the x-axis.
Figure 8C:
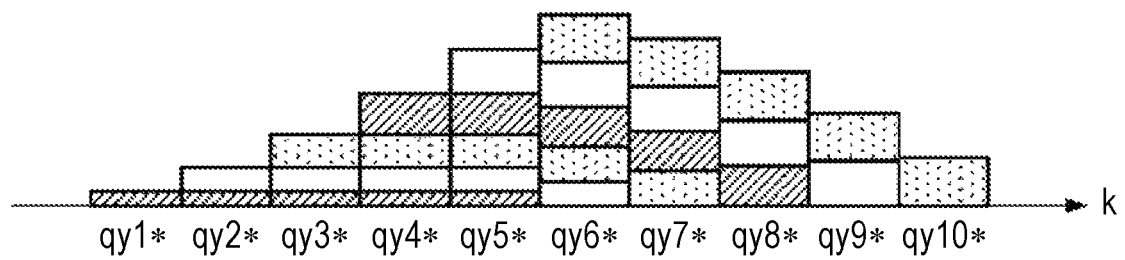
FIG. 8C shows a time series of the movement after filter processing with respect to the y-axis.

FIGS. 8A to 8C show a time series of the movement command and the trajectory of the movement command after filter processing in accordance with Comparative Example. FIG. 8A shows the xy trajectory by a movement command. FIG. 8B shows a time series of the movement command after filter processing with respect to the x-axis. FIG. 8C shows a time series of the movement command after filter processing with respect to the y-axis. In other words, FIGS. 8A to 8D show a state after processing by filter 10.

Figure 9:
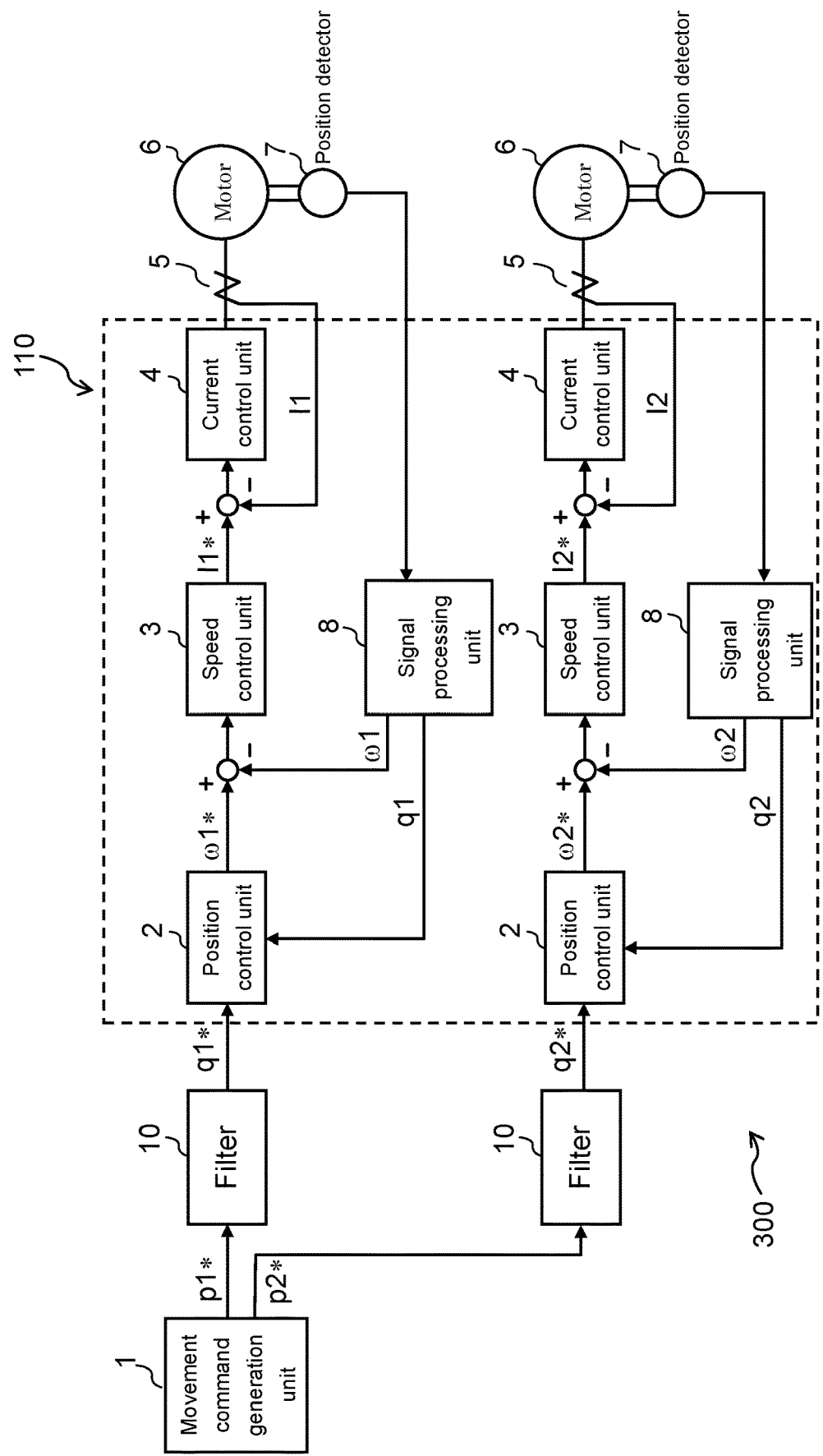
FIG. 9 is a block diagram showing a motor control device in accordance with Comparative Example.

FIG. 9 is a block diagram showing a configuration of motor control device 300 in accordance with Comparative Example.

As shown in FIG. 9, motor control device 300 is different from the configuration of motor control device 100 shown in FIG. 1 in that only filter 10 is provided from movement command generation unit 1 to position control unit 2 of each axis. Other configurations are the same except for this difference. Furthermore, a structure of filter 10 is the same as that of filter 23. That is to say, filter 10 is a five times average filter.

FIGS. 5A to 8C show an example of position control of a motor applied to an orthogonal robot consisting of two axes, i.e., the x-axis and the y-axis.

In FIGS. 5A, 6A, 7A and 8A, the point A represented by "⊚" represents a start point of the movement and the point B represents an end point of the movement, respectively.

Furthermore, in FIGS. 5A and 7A, the points represented by "◯" correspond to the interpolation positions before processing in movement command processing unit 20 or filter 10. The movement command between the interpolation positions is represented by pmi*(m=x, y; i=1 to 6).

In FIGS. 6A and 8A, the points represented by "●" correspond to the interpolation positions after processing in movement command processing unit 20 or filter 10. The movement command between the interpolation positions after the filter processing is represented by qmk*(m=x, y; k=1 to 10).

Furthermore, in FIG. 6A, the solid line linking the points A and B is the same as the xy trajectory shown in FIG. 5A. On the contrary, in FIG. 8A, the solid line linking the points A and B is different from the xy trajectory shown in FIG. 7A.

Furthermore, in FIGS. 5B, 5C, 6B, 6C, 7B, 7C, 8B, and 8C, in order to show the corresponding relation of data when movement command qmi* after filter processing is formed from movement command pmi*, the same data are shown by the same hatching.

Firstly, Comparative Examples are described.

For example, as shown in FIGS. 7B and 8B, movement command pm1* (m=x, y) is evenly allocated from qm1* to qm5* as a result of processing by filter 10. For example, components E1 to E5 of movement command px1* in FIG. 7B are processed by filter 10 and divided equally into five components, i.e., qx1* to qx5* of FIG. 8B.

Similarly, movement command pm2* is evenly allocated from qm2* to qm6*. For example, the components of movement commands px2* in FIG. 7B are processed by filter 10 and equally divided into five components, i.e., qx2* to qx6* in FIG. 8B.

In this way, the movement commands pmi* (i=1 to 6) are sequentially processed by filter 10, and the movement commands qmk* (k=1 to 10) are obtained.

As is apparent from the comparison between FIG. 7B and FIG. 8B, and the comparison between FIG. 7C and FIG. 8C, in the movement command qmk* after filter processing, a rapid change in the parts at start time and end of the movement is mitigated, with respect to movement command pmi* before filter processing. For example, the ordinate of FIG. 7B shows rapid rising from 0 to px1*. However, the ordinate of FIG. 8B shows gradual rising. This means that the excitation component included in movement command pmi* is reduced by the filter processing.

Therefore, a rapid operation at start time and end time of the movement are mitigated, and, for example, induction of vibration of a robot arm to which a motor is connected can be prevented.

On the other hand, however, when filter processing is carried out to movement command pm* output by the movement command generation unit, for each axis, as shown in FIG. 8A, the trajectory of the movement command qm* deviates from the original trajectory (dashed line connecting points A and B in FIG. 8A), that is, the trajectory drawn by movement command pm*.

This is because movement command pm* is divided into a plurality by the filter processing, and then, the individual components are respectively allocated so that they belong to different time series with respect to movement command qm* after filter processing.

For example, movement command qx5* shown in FIG. 8B is generated by adding parts of each of movement commands px1* to px5* shown in FIG. 7B. As a result, a value of movement command pm5* (m=x, y) before filter processing and a value of movement command qm5* (m=x, y) after filter processing are different from each other.

Consequently, even when the responsibility of control unit 110 is enhanced to control such that an actual movement amount qm becomes equal to the movement command qm*, a trajectory drawn by the actual movement amount qm does become equal to the trajectory by movement command pm* output from the movement command generation unit.

Next, control of motor control device 100 in accordance with this exemplary embodiment is described.

This exemplary embodiment is largely different from that of Comparative Example in that movement constant D is set and subjected to filter processing to obtain a value, and the value is used to deform processing of movement command pmi* (m=x, y; i=1 to 6) from movement command generation unit 1 and to generate a new movement command qmk* (m=x, y; k=1 to 10).

As shown in FIG. 6D, movement constant D of FIG. 5D is subjected to filter processing to obtain a new movement constant dk (k=1 to 10).

Using this dk, with respect to movement command pmi* (m=x, y, and i=1 to 6) from movement command generation unit 1 is subjected to the flowchart shown in FIG. 4 to obtain the movement command qmk* (m=x, y; k=1 to 10).

Note here that in order to obtain values shown in FIGS. 6B and 6C, not step S10 but step S20 in the flowchart shown in FIG. 4 is executed. Furthermore, FIGS. 5B and 5C show the case where the number of data is 6 (N=6). Motor control device 100 of this exemplary embodiment is particularly effective in a case where the size of data is different, as shown in FIGS. 5A to 5C.

As shown in FIGS. 6B and 6C, for example, the movement command pm1* is allocated to movement commands qm1*, qm2*, and qm3* after the processing of the flowchart shown in FIG. 4 is executed. Furthermore, movement command pm2* is allocated to movement commands qm3* and qm4* after the processing of the flowchart shown in FIG. 4 is executed.

For example, the component of movement command px1* in FIG. 5B is processed by filter 23 and allocated to qx1*, qx2*, and qx3* of FIG. 6B. Next, movement command px2* of FIG. 5B is processed by filter 23 and allocated to qx3* and qx4* of FIG. 6B. Herein, qx3* includes px1* and px2*.

Conceptually, a conventional movement command pm1* is divided along the abscissa as shown in FIG. 7B, while a movement command pm1* of the present application is divided along the ordinate as shown in FIG. 5B.

As shown in FIGS. 5B to 5D, the movement commands pm1* to pm6* and movement constant D are divided, and, based on them, new movement commands qm1* and qm10* and the movement constant dk are obtained. The sizes of the areas of regions obtained by dividing pmi* and D shown in FIGS. 5B to 5D correspond to the sizes of qmk* and dk shown in FIGS. 6B to 6D.

As shown in FIGS. 6B and 6C, one qmk* consists of at most two pmi*s. For example, as shown in FIG. 6B, qx3* includes two pmi*s, i.e., px1* and px2*. Furthermore, qx8* includes two pmi*s, i.e., px5* and px6*. Other movement command qmk*, after the filter processing, includes one movement command pmk*. That is to say, qx1*, qx2*, qx4*, qx5*, qx6*, qx7*, qx9*, and qx10* each includes one movement command pmk*. In short, one qmk* includes one or two pmi*. In other words, one qmk* does not include three or more pmi*s. Thus, it is possible to greatly suppress mixing of components of different time series in movement command pmi* into a new movement command qmk* after movement command processing.

Therefore, interpolation positions "•" after movement command processing shown in FIG. 6A hardly deviate from a curve that links interpolation positions "o" before the movement command processing shown in FIG. 5A.

As is apparent from FIGS. 6B and 6C, in qmk* obtained in the movement command processing, rapid changes at the start and end of the movement are mitigated. This means that the excitation component included in movement command pmi* is reduced. For example, the ordinate of FIG. 5B shows rapid rising from 0. However, the ordinate of FIG. 6B shows gradual rising.

An articulated robot includes motors and control units, the number of which corresponds to the number of joints. Each of the motors is connected to a robot arm via a speed reducer.

In a robot having such a configuration, the speed reducer and the arm are elastic materials to constitute a dual inertial system. In such a configuration, a vibration may occur during driving.

In particular, the vibration is likely to occur when a movement starts from a stationary state and when the movement is stopped at a target position.

According to this exemplary embodiment, a cut-off frequency of filter 23 is set corresponding to the natural vibration frequency of the above-mentioned dual inertial system with respect to movement command pm* output by movement command generation unit 1, and the filter processing of movement constant D is carried out. Thus, the movement command qm* in which the excitation component included in movement command pm* is reliably reduced can be generated. That is to say, the cut-off frequency of filter 23 may be a natural vibration frequency of the object to be driven.

Note here that the excitation component of this case is a vibration component centered on the natural vibration of the above-mentioned dual inertial system.

Consequently, rapid operations at start time and end time of the movement are mitigated, and induction of vibration of a robot arm can be prevented.

Note here that in this exemplary embodiment, the number of drive shafts of the robot is two, but the number is not limited to two. The number may be three or more. Therefore, in vector quantity Pi, Pj, Rk, and Qk* shown in FIGS. 2 and 3, the number of elements is not limited to two. Even in the case where the number of elements is three or more, the configuration shown in this exemplary embodiment can be applied.

Furthermore, the configurations shown in FIGS. 1 and 2 can be achieved either in software or in hardware. The configuration can be achieved in hardware with the use of a logic device that enables programs such as FPGA (Field Programmable Gate Array).

Second Exemplary Embodiment

Figure 10:
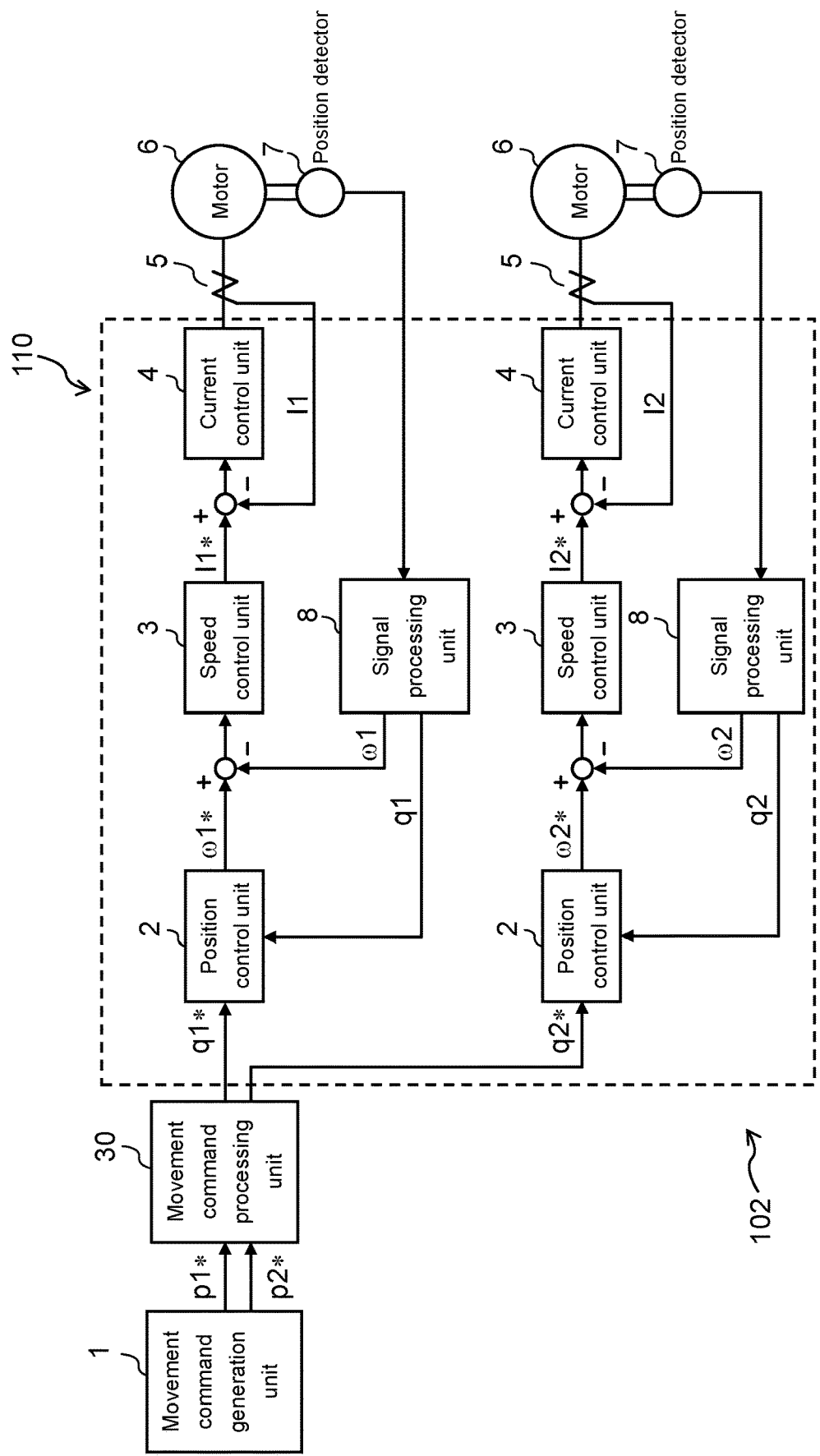
FIG. 10 is a block diagram showing a configuration of a motor control device in accordance with a second exemplary embodiment.

FIG. 10 is a block diagram showing a configuration of motor control device 102 in accordance with this exemplary embodiment.

Figure 11:
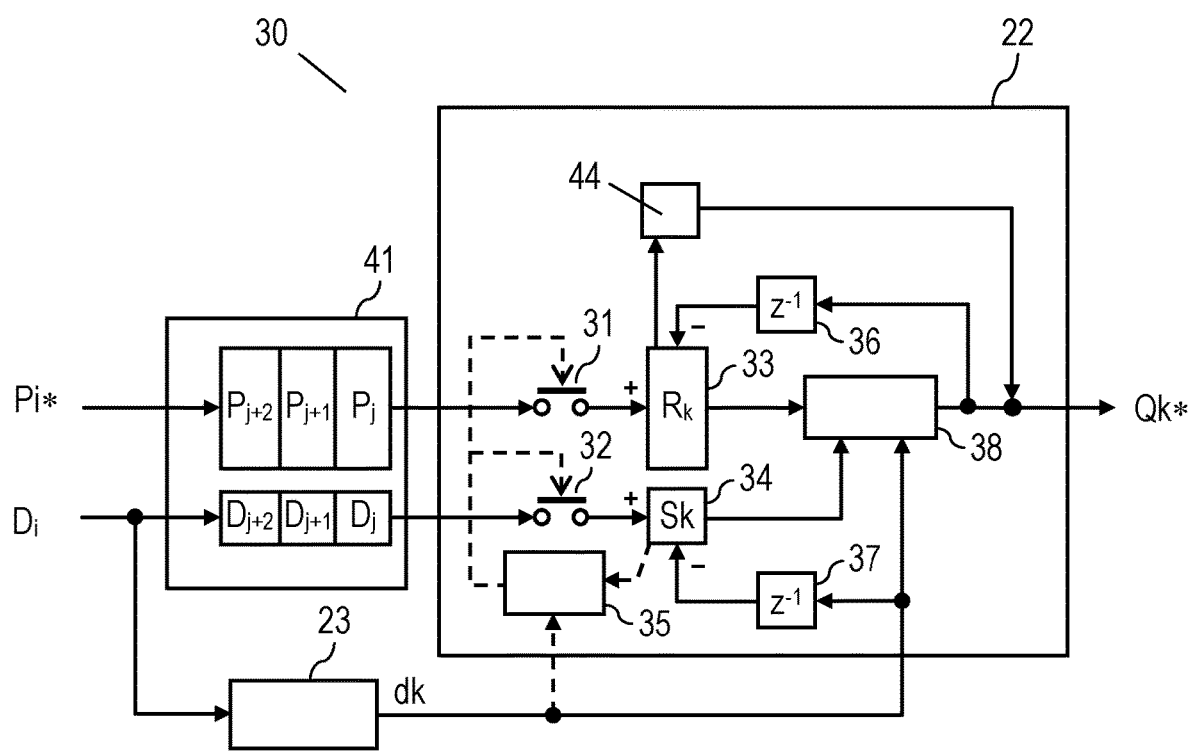
FIG. 11 is a block diagram showing a configuration of a movement command processing unit in accordance with the second exemplary embodiment.

FIG. 11 is a diagram showing a configuration of movement command processing unit 30 in accordance with this exemplary embodiment.

FIG. 12 shows a flowchart in movement command processing unit 30 in accordance with this exemplary embodiment.

Note here that the same reference marks are given to the same configurations and steps, and detailed description thereof are omitted herein.

Configuration and Operation of Movement Command Processing Unit

This exemplary embodiment is different from the first exemplary embodiment in the internal configuration of movement command processing unit 30, in which a movement constant Di is input into buffer 41, and extracted as Dj from buffer 41. As described later, this permits corresponding to a case where movement constant Di is changed.

As shown in FIG. 11, movement command processing unit 30 includes buffer 41, processing unit 22, and filter 23.

Buffer 41 receives and temporarily holds an input of movement commands pm* (m=1, 2) from movement command generation unit 1 and movement constant Di.

Buffer 41 performs a so-called FIFO (First-In First-Out) operation in which data input first are output first.

Movement command Pi* to be input into buffer 41 is a vector quantity having movement command pm* (m=1, 2) as an element. The suffix i attached to movement command Pi* and movement constant Di represent order of input to buffer 41.

Movement command Pi* and movement constant Di are input into buffer 41 for each predetermined period. Furthermore, suffix j of movement command Pj and movement constant Dj held in buffer 41 represents an order of movement command Pj and movement constant Dj to be extracted from buffer 41.

Herein, movement constant Di or movement constant Dj is a scalar quantity proportional to a distance between the neighboring interpolation positions based on movement command Pi*. Since the distance between the neighboring interpolation positions is a movement distance for each predetermined time, it can be regarded as a speed. Therefore, movement constant Di can be a value proportional to the movement speeds of an end effector of a robot or an object to be driven by a motor based on movement command Pi*.

Note here that the proportional constant for determining movement constant Di from the distance between the neighboring interpolation positions may be an arbitrary value.

Extraction of movement command Pj and movement constant Dj held in buffer 41 is carried out at any time, and it is not necessarily synchronized to the input of movement command Pi* and movement constant Dj into buffer 41.

Filter 23 is a digital filter, and the configuration and property thereof are as described in the first exemplary embodiment.

Movement constant Di is input into filter 23 in synchronization with the input of movement command Pi* and movement constant Di to buffer 41.

Filter 23 performs a filter arithmetic operation in synchronization with input of movement constant Di, and the result thereof is output as a new movement constant dk.

Herein, suffix k of dk represents the order of dk output from the filter.

Processing unit 22 is a processing unit that extracts movement command Pj from buffer 41, processes the extracted command, and outputs the processed command as a new movement command Qk* as described in the first exemplary embodiment.

However, in switch 32 of processing unit 22, a fixed constant D is input in the first exemplary embodiment, while movement constant Dj held in buffer 41 is input in the second exemplary embodiment.

Furthermore, in switch 31, Pj held in buffer 41 is input. The input of Pj and the input of Dj are in synchronization with each other. Both inputs are carried out simultaneously according to an opening/closing operation of determination unit 35.

The other processing in processing unit 22 until movement command Qk* is output is the same as described in the first exemplary embodiment.

Movement Command Flow

Next, a flow of processing in movement command processing unit 30 is described.

The flowchart shown in FIG. 12 is different from the flowchart shown in FIG. 4 in that step S23 instead of step S3, step S26 instead of step S6, and step S36 instead of step S16 are executed, respectively.

In step S23, movement constant Di, together with movement command Pi, is also input into buffer 41. Furthermore, Di is input also into filter 23.

In step S26, Dj, together with movement command Pj, is extracted from buffer 41. The extracted Dj is added to Sk.

In step S36, Dj, together with movement command Pj, is extracted from buffer 41. The extracted Dj is added to Sk.

In the steps other than these steps, the same processing as in the flowchart shown in FIG. 4 are carried out.

Note here that step S30 is the same as step S10 shown in FIG. 4 except that step S26 instead of step S6 is executed. Step S40 is the same as step S20 shown in FIG. 4 except that step S36 instead of step S16 is executed.

Therefore, as described in the first exemplary embodiment, step S30 can be replaced with step S40.

Arithmetic operation represented by the mathematical formula Math. 1 in step S7 and step S17 may be replaced with an arithmetic operation represented by the mathematical formula Math. 4.

Figure 13A:
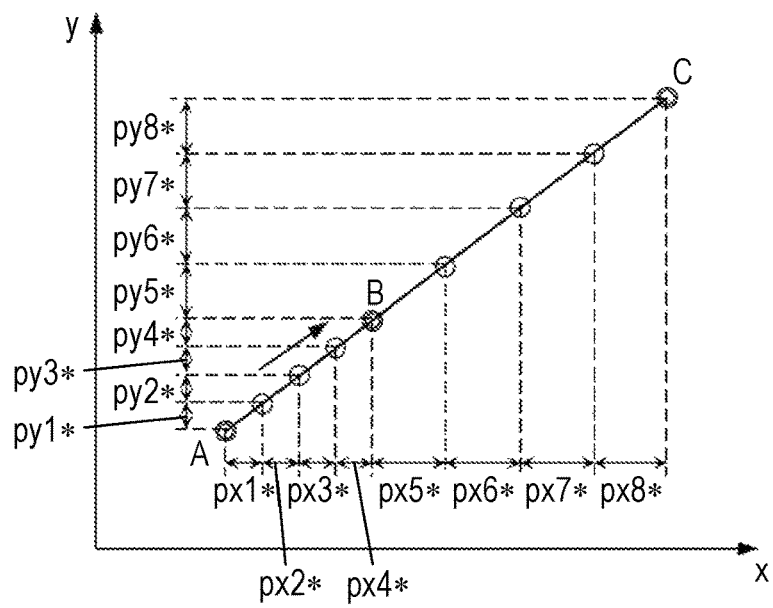
FIG. 13A shows the xy trajectory by a movement command of the motor control device in accordance with the second exemplary embodiment.
Figure 13B:
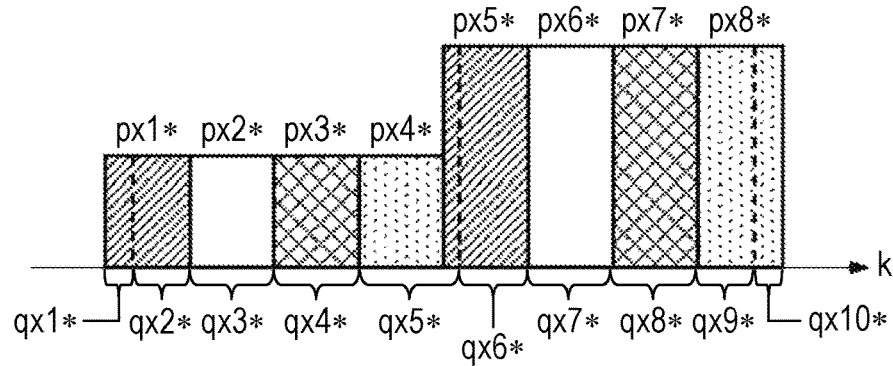
FIG. 13B shows a time series of the movement command with respect to the x-axis.
Figure 13C:
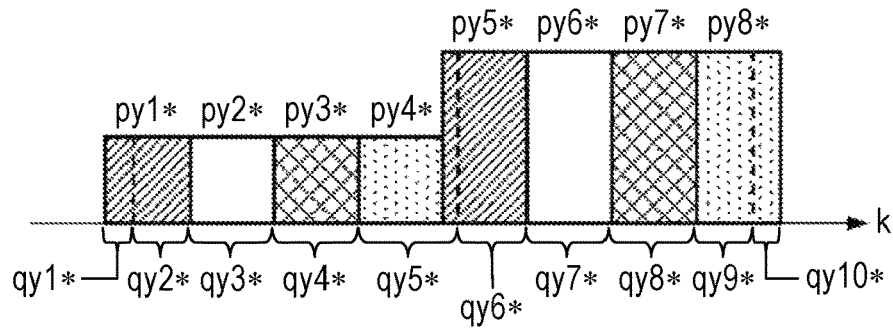
FIG. 13C shows a time series of the movement command with respect to the y-axis.
Figure 13D:
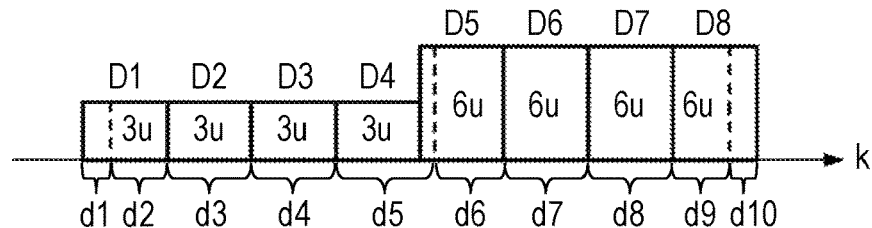
FIG. 13D shows a time series of the movement constant output.

Relation between Movement Command and Movement Trajectory Before and After Movement Command Processing FIGS. 13A to 13C show a time series of a movement command of motor control device 102 and a trajectory by the movement command in accordance with this exemplary embodiment. FIG. 13A shows the xy trajectory by the movement command. FIG. 13B shows a time series of the movement command with respect to the x-axis. FIG. 13C shows a time series of the movement command with respect to the y-axis. FIG. 13D shows a time series of the movement constant output. FIGS. 13A to 13D show a state before processing in movement command processing unit 30.

Figure 14A:
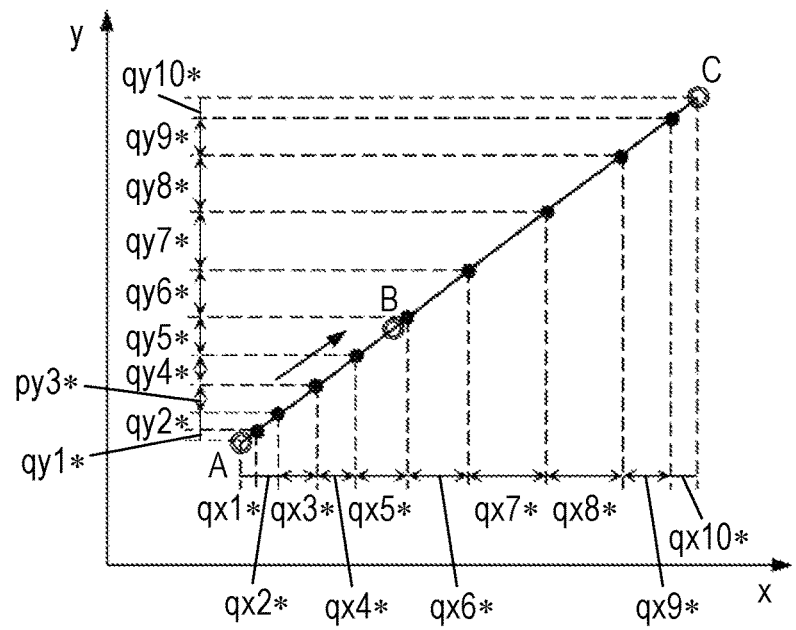
FIG. 14A shows the xy trajectory by a movement command after execution of the flowchart shown in FIG. 12.
Figure 14B:
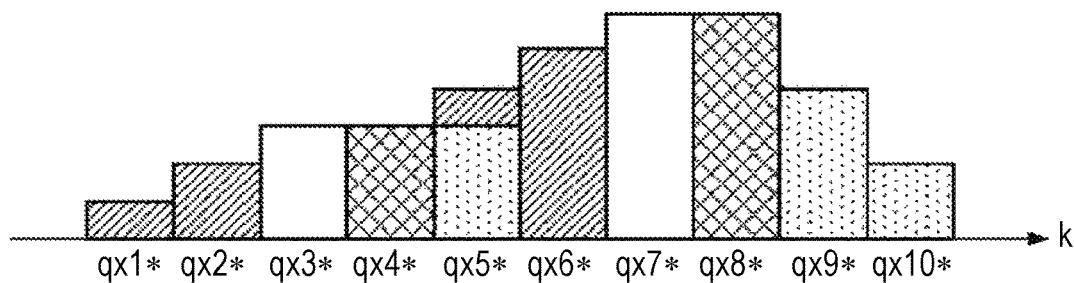
FIG. 14B shows a time series of the movement command after processing with respect to the x-axis.
Figure 14C:
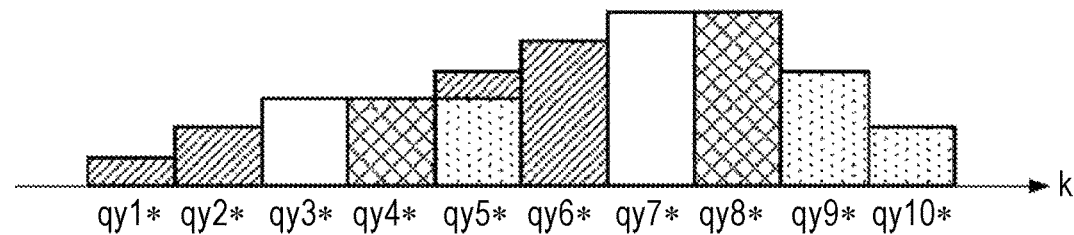
FIG. 14C shows a time series of the movement command after processing with respect to the y-axis.
Figure 14D:
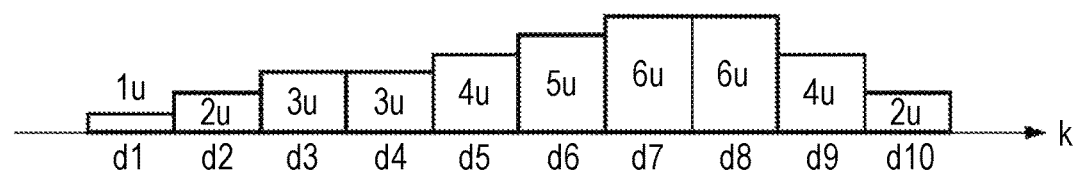
FIG. 14D shows a time series of movement constant output after processing.

FIGS. 14A to 14C show a time series of the movement command after processing of the flowchart shown in FIG. 12 and the trajectory by the movement command. FIG. 14A shows the xy trajectory by the movement command after processing. FIG. 14B shows a time series of the movement command with respect to the x-axis after processing. FIG. 14C shows a time series of the movement command with respect to the y-axis after processing. FIG. 14D shows a time series of movement constant output after processing. FIGS. 14A to 14D show a state after processing in movement command processing unit 30.

Note here that filter 23 is a five-stage FIR digital filter, and a filter constant of each stage is ⅕. That is to say, filter 23 is a five times average filter.

In FIGS. 13A and 14A, the point A represented by "⊚" represents a start point of the movement, the point B represents a middle point of the movement, and the point C represents an end point of the movement, respectively.

Furthermore, in FIG. 13A, the points represented by "○" correspond to the interpolation positions before filter processing. The movement command between the interpolation positions is represented by pmi*(m=x, y; i=1 to 6).

In FIG. 14A, the points represented by "●" correspond to the interpolation positions after filter processing. The movement command between the interpolation positions after the filter processing is represented by qmk* (m=x, y, and k=1 to 10).

Furthermore, in FIGS. 13B, 13C, 14B, and 14C, in order to show the corresponding relation of data when a new movement command qmk* is formed from movement command pmi*, the same data are shown by the same hatching.

As shown in FIGS. 13A to 13C, a case where the movement speed is changed before and after the middle point B is considered. The movement speed from the middle point B to the end point C is twice as high as the movement speed from the start point A to the middle point B.

As shown in FIG. 13D, in response to the above-mentioned speed change, the value of movement constant Di becomes twice as high after middle point B. In other words, movement constant Di is made to be a value proportional to the movement speed.

Note here that a value u shown in FIG. 13D is a proportional constant and any values.

As shown in FIG. 14D, movement constant Di in FIG. 13D is subjected to filter processing to obtain dk (k=1 to 10).

Using this dk, by executing the flowchart shown in FIG. 12 with respect to movement command pmi* (m=x, y, and i=1 to 6) from movement command generation unit 1, the movement command qmk* (m=x, y; k=1 to 10) is obtained.

Note here that in order to obtain values shown in FIG. 14A, not step S30 but step S40 in the flowchart shown in FIG. 12 is executed. Furthermore, FIGS. 13B and 13C show the case where the number of data is 8 (N=8).

For example, movement constant D1 is allocated to movement constants d1 and d2 after the processing of the flowchart shown in FIG. 12 is executed. With the use of this allocation, movement command pm1* is allocated to movement commands qm1* and qm2* after the processing of the flowchart shown in FIG. 12 is executed.

For example, the component of movement command px1* in FIG. 13B is processed by filter 23 and allocated to qx1* and qx2* of FIG. 14B. Next, movement command px2* of FIG. 13B is processed by filter 23 and allocated to qx3* of FIG. 14B.

Conceptually, movement command pmt* of the present application is divided along the ordinate as shown in FIG. 13B.

Furthermore, movement constant D5 immediately after the movement speed is changed is allocated to movement constants d5 and d6 after the flowchart shown in FIG. 12 is executed. With the use of this allocation, movement command pm5* is allocated to movement constants qm5* and qm6* after the processing of the flowchart shown in FIG. 12 is executed.

Shown in FIGS. 14B to 14D, movement constant Di and movement commands pm1* to pm6* are divided, and based on them, the movement commands qm1* to qm10* and dk are obtained. The size of the areas of regions obtained of the divided pmi* and Di shown in FIGS. 13B to 13D correspond to the sizes of qmk* and dk shown in FIGS. 14B to 14D.

As shown in FIGS. 14B and 14C, one qmk* consists of at most two pmi*s. In short, one qmk* includes one or two pmi*s. In other words, one qmk* does not include three or more pmi*s. Thus, it is possible to greatly suppress mixing of components of different time series in movement command pmi* into a new movement command qmk* after movement command processing.

Therefore, interpolation positions "•" after movement command processing shown in FIG. 14A hardly deviate from a curve that links interpolation positions "o" before the movement command processing shown in FIG. 13A.

As is apparent from FIGS. 14B and 14C, in qmk* obtained in the movement command processing, a rapid change in value not only at the start and end of the movement but also at the middle point B at which the speed is rapidly changed is mitigated. This means that the excitation component included in movement command pmi* is reduced. For example, the ordinate of FIG. 13B shows rapid rising from px4* to px5*. However, the ordinate of FIG. 14B shows gradual rising.

As described above, when motor control device 102 of this exemplary embodiment is applied to, for example, an articulated robot, the rapid operation at the start and end of the movement and the middle of the movement of the robot arm is mitigated, and the induction of the vibration can be prevented.

Note here that in this exemplary embodiment, the number of drive shafts of the robot is two, but the number of shafts is not necessarily limited to two. The number of drive shafts may be three or more. That is to say, in the vector quantities Pi, Pj, Rk, and Qk* shown in FIGS. 11 and 12, the number of elements is not limited to two. Even in the case where the number of elements is three or more, the configuration shown in this exemplary embodiment can be applied.

Furthermore, the configurations shown in FIGS. 10 and 11 can be achieved either in software or in hardware. The configuration can be achieved in hardware with the use of a logic device that enables programs such as FPGA (Field Programmable Gate Array).

Third Exemplary Embodiment

Figure 15A:
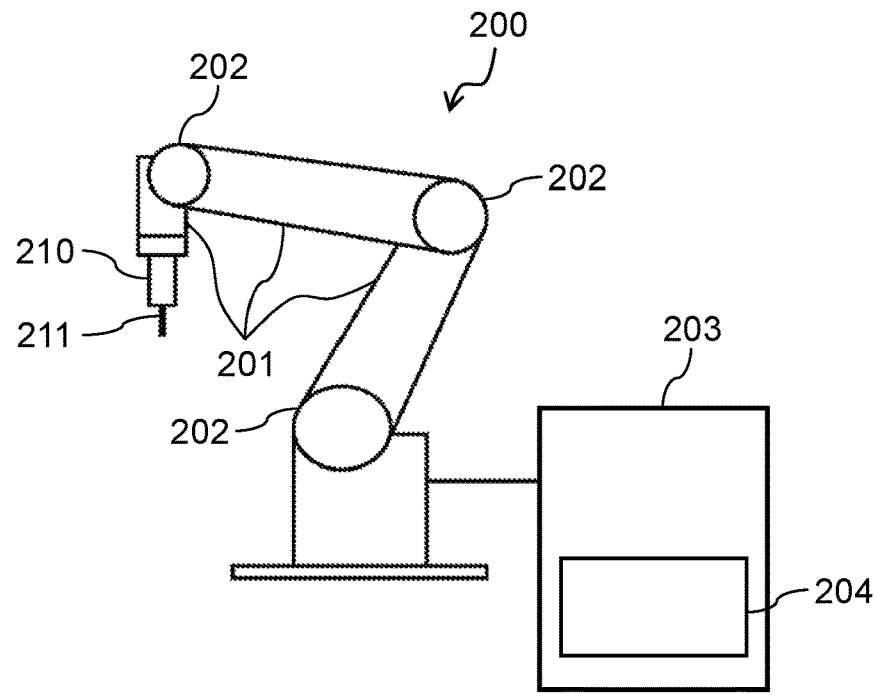
FIG. 15A is a schematic configuration view of a welding robot in accordance with the third exemplary embodiment.
Figure 15B:
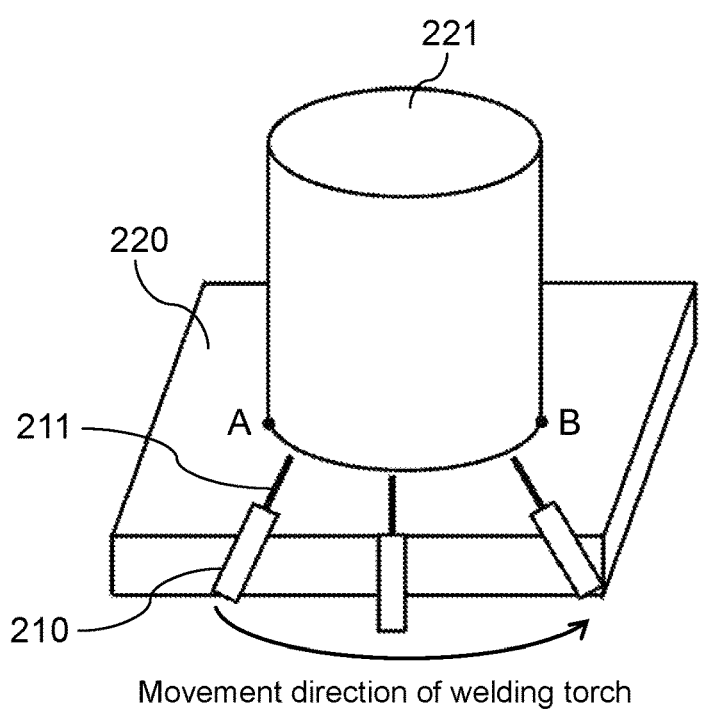
FIG. 15B is a view showing a movement of a welding wire at the time when a workpiece is welded.

FIG. 15A is a schematic configuration view of welding robot 200 in accordance with this exemplary embodiment. FIG. 15B is a view showing a movement of welding wire 211 in welding a workpiece.

As shown in FIG. 15A, welding robot 200 that is an articulated robot (an object to be driven) includes a plurality of arms 201, and a plurality of joint shafts 202 therebetween. Welding torch 210 is installed at a tip of arm 201. Welding wire 211 is attached to a tip of welding torch 210. Arc is generated between welding wire 211 and workpiece 220 to perform welding.

Welding robot 200 is electrically connected to robot control device 203. Robot control device 203 includes motor control devices 204. The number of motor control devices 204 corresponds to the number of joint shafts. Details of robot control device 203 and arrangement of motors 6 (not shown) corresponding to each joint shaft 202 are omitted herein.

In this exemplary embodiment, motor control device 204 has the same configuration as that of motor control device 100 or motor control device 102 shown in the first or second exemplary embodiment.

As shown in FIG. 15B, in welding plate-like workpiece 220 and substantially cylindrical workpiece 221 to each other, the tip of welding wire 211 needs to reliably draw a trajectory from the starting point A to the end point B of a weld portion. If the tip of welding wire 211 deviates from the trajectory, welding failure may occur in the deviating portion.

According to this exemplary embodiment, motor 6 faithfully tracks a movement trajectory indicated by the movement command. Therefore, welding wire 211 attached to the tip of arm 201 moves without deviating from the trajectory, so that welding failure can be reduced.

Also, the excitation component included in movement command pm* of motor 6 can be reduced. Therefore, the rapid operation of arm 201 by change of movement speed at start time and end time of the movement and in the middle is mitigated, and induction of vibration can be prevented.

From the above description, at the movement start time or at the time of rapid acceleration of an arm, non-formation of a weld bead can be suppressed. Furthermore, the movement end time or at the time of rapid speed reduction of the arm, it is possible to suppress formation of a pool of a weld bead. Furthermore, the vibration of the arm is suppressed, so that the movement accuracy of the tip of the welding wire is improved.

Note here that in this exemplary embodiment, an arc welding robot is described, but the motor control device of the present disclosure is not limited to this exemplary embodiment, and can be applied to other robots or industrial machines such as an automatic transfer system, As mentioned above, the motor control device of the present disclosure can remove an excitation component included in an original command trajectory, and can carry out position control such that a command trajectory after filter processing is not displaced from the original command trajectory.

As mentioned above, the motor control device of the present disclosure sets a constant to be paired with the movement command, and performs filter processing of the constant to obtain a new constant. This new constant is used to perform filter processing of the movement command of a motor.

Specifically, the motor control device of the present disclosure includes a movement command generation unit that outputs a movement command of a motor, and a control unit that controls the motor based on the movement command. The motor control device includes a movement command processing unit that processes the movement command, and outputs a new movement command. The movement command processing unit includes a buffer that holds a movement command, a filter that performs filter processing of a constant paired with the movement command, and a processing unit that generates and outputs a new movement command based on the movement command held in the buffer, and the constant that has been subjected to filter processing. The new movement command is a value proportional to the filtered constant that has been subjected to filter processing.

This configuration can suppress mixing of movement commands of different time series into the new movement command by allowing the newly generated movement command to be proportional to the constant that has been filter processing. As a result, position control of the motor can be carried out so that the command trajectory after filter processing is not displaced from the original command trajectory. Furthermore, the filter processing permits removal of an excitation component included in the natural command trajectory.

Herein, the constant paired with the movement command is preferably a value proportional to a movement speed of an object to be driven by a motor.

This configuration permits position control of the motor so that a command trajectory of an object to be driven after filter processing is not displaced from the natural command trajectory in the case of a rapid change in the movement speed of the motor.

Furthermore, a motor position control method according to the present disclosure is a method for performing position control of a motor based on a movement command output from any one of the above-mentioned motor control devices. The method includes a first step of inputting and holding a movement command in the buffer. Furthermore, the method includes a second step of inputting a constant into the filter, performing filter processing of the constant, and generating a new constant. Furthermore, the method includes a third step of extracting the movement command held in the buffer, adding the extracted movement command to a value held in a first holding section in the processing unit, and holding the addition value, while adding the constant to a value held in a second holding section in the processing unit, and holding the addition value. Furthermore, the method includes a fourth step of performing an arithmetic operation based on the new constant, the addition value held in the first holding section, and the addition value held in the second molding section, and generating a new movement command proportional to the new constant, while subtracting the new movement command from the first addition value held in the first holding section to obtain a value and holding the obtained value in the first holding section, and subtracting the new constant from the second addition value held in the second holding section to obtain a value, and holding the obtained value in the second holding section.

According to this method, a movement command can be extracted from the buffer sequentially, and held in the processing unit, and thereby an arithmetic operation with the filtered constant can be carried out for a short time.

It is preferable that in the third step, the held addition value is extracted from the first holding section in the processing unit, held in a third holding section in the processing unit, then the movement command is extracted from the buffer, and the extracted command is added and held in the first holding section in the processing unit; and an addition value of the constant held in the second holding section in the processing unit is subtracted from a new constant, and then the constant is input into the second holding section in the processing unit. It is preferable that in the fourth step, an addition value of the movement command held in the third holding section in the processing unit is added to the first arithmetic operation result, and the resultant value is output as a new movement command.

It is preferable that in the first step, the movement command and the constant are input and held in a buffer; and in the third step, the constant held in the buffer is added or input, and held in the second holding section.

This method permits an arithmetic operation for a short time, in which the movement constant is also extracted from the buffer sequentially, and held in the processing unit, and thereby, a new movement command is generated using the movement command and the constant that has been subjected to filter processing, even when the movement constant is changed, for example, the movement constant is a value proportional to the movement speed of the motor.

It is preferable that in the second step, the same number of constants as the number of movement commands to be input into the filter are input into a filter and subjected to be filter processing, and that, furthermore, a series of processing from the first step to the fourth step is repeatedly executed until the new constant becomes a predetermined value or less.

This method can check whether a new constant remains in the filter, and can determine the end timing of the repeated processing.

An industrial machine of the present disclosure includes a motor, any one of the above-mentioned motor control devices for controlling the motor, and an object to be driven by the motor. The cut-off frequency of the filter is natural vibration frequency of the object to be driven.

INDUSTRIAL APPLICABILITY

A motor control device of the present disclosure can prevent excitation at the start time and end time of operation, and at the time when the movement speed is rapidly changed without generating an error in the command trajectory with respect to the ideal trajectory. Therefore, the motor control device is extremely useful when it is applied to industrial machines, such as a robot, driven by a motor and having a natural vibration.

REFERENCE MARKS IN THE DRAWINGS 1 movement command generation unit
2 position control unit
3 speed control unit
4 current control unit
5 current detector
6 motor
7 position detector
8 signal processing section
10 filter
20, 30 movement command processing unit
21 buffer
22 processing unit
23 filter
31 switch
32 switch
33 holding section
34 holding section
35 determination unit
36, 37 element
38 arithmetic operation unit
41 buffer
44 holding section
100, 102, 300 motor control device
110 control unit
200 welding robot
201 arm
202 joint shaft
203 robot control device
204 motor control device
210 welding torch
211 welding wire
220 workpiece
221 workpiece

The invention claimed is:

1. A motor control device comprising:
a movement command generation unit that outputs a movement command of a motor;
a movement command processing unit including
a buffer that holds the movement command;
a filter that performs filter processing of a constant and generates a new constant; and
a processing unit that performs arithmetic processing based on the movement command held in the buffer and the new constant generated by the filter, and generates and outputs a new movement command proportional to the new constant; and
a control unit that controls the motor based on the new movement command.

2. The motor control device of claim 1, wherein the constant is a value proportional to a movement speed of an object to be driven by the motor.

3. An industrial machine comprising:
a motor;
a motor control device of claim 2, the motor control device controlling the motor; and
an object to be driven by the motor,
wherein a cut-off frequency of the filter is a natural vibration frequency of the object to be driven.

4. The motor control device of claim 1, wherein the control unit integrates the new movement command, and subtracts a movement amount of an object to be driven by the motor.

5. An industrial machine comprising:
a motor;
a motor control device of claim 1, the motor control device controlling the motor; and
an object to be driven by the motor,
wherein a cut-off frequency of the filter is a natural vibration frequency of the object to be driven.

6. A motor position control method for performing position control of a motor, using a movement command processing unit including a buffer, a filter, and a processing unit, the method comprising:
a first step of inputting and holding a movement command in the buffer;
a second step of inputting a constant into the filter, performing filter processing of the constant, and generating a new constant;
a third step of extracting the movement command held in the buffer, adding the extracted movement command to a value held in a first holding section in the processing unit to obtain a first addition value, and holding the first addition value while adding the constant to a value held in a second holding section in the processing unit to obtain a second addition value, and holding the second addition value; and
a fourth step of performing an arithmetic operation based on the new constant, the first addition value, and the second addition value, generating a new movement command proportional to the new constant, and subtracting the new movement command from the first addition value held in the first holding section to obtain a value, and holding the obtained value in the first holding section, while subtracting the new constant from the second addition value held in the second holding section to obtain a value, and holding the obtained value in the second holding section.

7. The motor position control method of claim 6, wherein
in the third step, the first addition value held in the first holding section is extracted and held in a third holding section in the processing unit, then the movement command is extracted from the buffer, and input and held in the first holding section; and the second addition value held in the second holding section is subtracted from the new constant, and then the constant is input and held in the second holding section; and
in the fourth step, the first addition value held in the third holding section is added to a result of the arithmetic operation, and an addition value is output as the new movement command.

8. The motor position control method of claim 7, wherein in the second step, the constant is input into the filter and subjected to filter processing, the number of the constant being equal to the number of the movement commands to be input into the buffer, and
a series of processing from the first step to the fourth step is repeatedly executed until the new constant becomes a predetermined value or less.

9. The motor position control method of claim 7, wherein
in the first step, the movement command and the constant are input and held in the buffer, and
in the third step, the constant held in the buffer is added or input and held in the second holding section.

10. The motor position control method of claim 9, wherein in the second step, the constant is input into the filter and subjected to filter processing, the number of the constant being equal to the number of the movement commands to be input into the buffer, and a series of processing from the first step to the fourth step is repeatedly executed until the new constant becomes a predetermined value or less.

11. The motor position control method of claim 6, wherein in the first step, the movement command and the constant are input and held in the buffer, and in the third step, the constant held in the buffer is added or input, and held in the second holding section.

12. The motor position control method of claim 11, wherein in the second step, the constant is input into the filter and subjected to filter processing, the number of the constant being equal to the number of the movement commands to be input into the buffer, and a series of processing from the first step to the fourth step is repeatedly executed until the new constant becomes a predetermined value or less.

13. The motor position control method of claim 6, wherein in the second step, the constant is input into the filter and subjected to filter processing, the number of the constant being equal to the number of the movement commands to be input into the buffer, and a series of processing from the first step to the fourth step is repeatedly executed until the new constant becomes a predetermined value or less.

\* \* \* \* \*